(12) United States Patent
Mutalik et al.

(10) Patent No.: US 11,405,100 B2
(45) Date of Patent: Aug. 2, 2022

(54) METHODS AND SYSTEMS FOR MONITORING OPTICAL NETWORKS

(71) Applicant: Comcast Cable Communications, LLC, Philadelphia, PA (US)

(72) Inventors: Venk Mutalik, Middletown, CT (US); Daniel Rice, Boulder, CO (US); John Paul Fioroni, Ardmore, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 16/262,568

(22) Filed: Jan. 30, 2019

(65) Prior Publication Data

US 2020/0244353 A1 Jul. 30, 2020

(51) Int. Cl.
*H04B 10/08* (2006.01)
*H04B 10/071* (2013.01)
*H04B 10/079* (2013.01)
*H04J 14/02* (2006.01)

(52) U.S. Cl.
CPC ..... *H04B 10/071* (2013.01); *H04B 10/07955* (2013.01); *H04B 10/07957* (2013.01); *H04J 14/0201* (2013.01)

(58) Field of Classification Search
CPC ............ H04B 10/071; H04B 10/07955; H04B 10/07957; H04B 10/0795; H04B 10/40; H04B 3/46; H04B 10/2503; H04B 10/07953; H04B 10/0799; H04B 10/0771; H04B 10/0775; H04B 10/032; H04B 10/0779; H04B 10/0791; H04J 14/0201; H04J 14/0279; H04J 14/02; H04J 14/0205; H04Q 2011/0083; H04Q 2011/0015
USPC ... 398/34, 25, 28, 31, 79, 82, 83, 85, 17, 38
See application file for complete search history.

(56) References Cited

U.S. PATENT DOCUMENTS

| | | | | |
|---|---|---|---|---|
| 6,211,978 B1* | 4/2001 | Wojtunik | ........... | H04B 10/2589 398/9 |
| 6,501,871 B1* | 12/2002 | Sucharczuk | ........... | H04B 10/27 385/24 |
| 8,693,866 B1* | 4/2014 | Lam | ................... | H04Q 11/0067 398/21 |
| 9,689,968 B2* | 6/2017 | Zou | ....................... | H01Q 3/2676 |
| 2005/0286895 A1* | 12/2005 | Lee | ...................... | H04J 14/0282 398/79 |
| 2009/0175626 A1* | 7/2009 | Yang | ................... | H04B 10/2971 398/135 |
| 2011/0091210 A1* | 4/2011 | Cheng | ................... | H04J 3/1694 398/61 |
| 2011/0255860 A1* | 10/2011 | Lee | .................... | H04B 10/0771 398/12 |
| 2011/0293267 A1* | 12/2011 | Ruchet | ............... | H04B 10/0793 398/25 |
| 2013/0183039 A1* | 7/2013 | Hood | .................. | H04J 14/0234 398/72 |
| 2014/0270766 A1* | 9/2014 | Gross | ................. | H04Q 11/0005 398/48 |

(Continued)

*Primary Examiner* — Hibret A Woldekidan
(74) *Attorney, Agent, or Firm* — Ballard Spahr LLP

(57) ABSTRACT

Methods and systems for monitoring an optical network are described. An optical device may receive a data signal. The optical device may send the data signal to a test port. A measuring device may measure characteristics associated with the data signal.

24 Claims, 8 Drawing Sheets

(56) References Cited

U.S. PATENT DOCUMENTS

2014/0363157 A1* 12/2014 Ruchet ............ H04B 10/07955
398/38
2019/0158190 A1* 5/2019 Huh ...................... H04B 10/69

* cited by examiner

METHODS AND SYSTEMS FOR MONITORING OPTICAL NETWORKS

BACKGROUND

Optical networks (e.g., Fiber Optic Networks) may have many active (optical transmitters/receivers) or passive (optical multiplexers/de-multiplexers/couplers) devices throughout the network that need to be tested to ensure the optical network is performing appropriately, as well as to identify any problems with the optical network. However, testing the optical devices of an optical network may require personnel to access each optical device, and attach a measuring device to the optical device in order to determine the performance of the optical network. Often attaching the measurement device requires disconnecting the network from service. Thus, when there is a service outage, service personnel may require extended periods of time to identify the location of the problem in the optical network, as well as fix the problem. Further, multiple measuring devices may need to be coupled to multiple testing ports of each optical device in order to determine multiple characteristics associated with the optical network in order to properly diagnose a source of the problem.

SUMMARY

It is to be understood that both the following general description and the following detailed description are exemplary and explanatory only and are not restrictive. Methods and systems for monitoring optical networks are described. To facilitate monitoring an optical network, an optical device may have one or more couplers and/or one or more add-drop multiplexers to split up an incoming data signal. A portion of the split up data signal may be sent to an output port that outputs the portion to an optical network. Another portion of the split up data signal may be sent to a test port. A monitoring device may be in communication with the test port to measure characteristics of the optical network. By using the couplers and/or add-drop multiplexers, the monitoring device may be able to measure more than one characteristic of the optical device using only a single test port. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
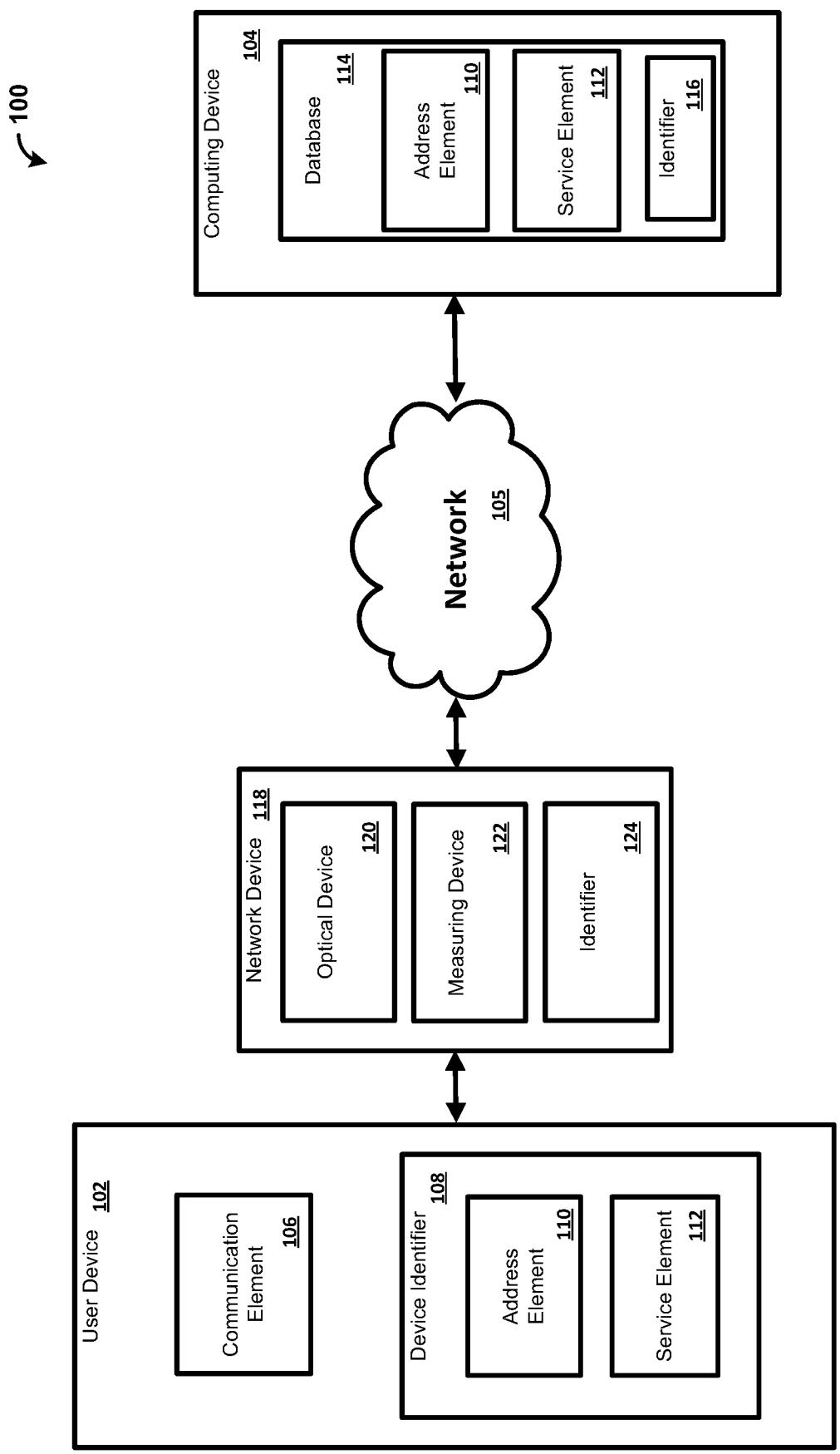
FIG. 1 shows a system for session management for delivery of content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

An efficient fiber optic system may include optical devices that have a consolidated test and monitoring port (e.g., reciprocal bi-directional use of monitoring) to increase the efficiency of the fiber optic system. Optical devices may be reciprocal devices. That is, the optical devices behave identically in the forward and reverse directions. The optical devices may aggregate or separate light received via optical links into one or more wavelengths of light. That is, the optical devices may perform as a multiplex (MUX) device or as a demultiplex (DMUX) device depending on the direction the light travels through the optical device. The optical devices may have a common (COM) port that provides an interface to an optical link. The COM port may contain all of the aggregated wavelengths in the MUX capability or accepts incoming wavelengths for separation for the DMUX capability. The optical devices may be passive devices. The optical devices may have test points that enable technicians to measure the wavelengths of light and the power of the individual wavelengths to determine the total power in the optical network.

Optical networks may utilize light to transmit data. The optical networks may utilize different wavelengths of light to transmit the data. The spectrum of wavelengths used in optical networks may extend from approximately 1200-1700 nm, with the wavelengths broken into separate bands. The bands may be the Original (O) band from 1260-1360 nm, the Extended (E) band from 1360-1460 nm, the Short Wavelengths (S) band from 1460-1530 nm, the Conventional (C) band from 1530-1565 nm, the Long Wavelengths (L) band from 1565-1625 nm, and the Ultra-Long Wavelengths (U) band from 1625-1675 nm. Each optical device may be associated with only a specific band out of the entire spectrum. The optical devices may have optical ports that enable additional spectrums (e.g., additional wavelength bands) to be added on later as necessary. These ports may be an Express (EXP) port or an Upgrade (UPG) port. The EXP port may add capability in the C band. The UPG port may add capability in a band other than the C band. While specific examples of wavelengths of light are provided above, a person skilled in the art would appreciate that the optical network described herein may utilize any wavelength of light and should not be limited to the aforementioned examples.

The optical devices may separate the wavelengths into two separate groups. The first group may be wavelengths associated with a headend of the optical network and the second group may be associated with nodes of the optical network. By utilizing two groups of wavelengths, wider temperature characteristics associated with the wavelengths may be utilized.

A measuring device may utilize one or more Optical Spectrum Analyzers (OSA) and Optical Time Domain Reflectometers (OTDR) to measure signal levels and/or detect problems associated with a fiber optic network (e.g., damage to fiber cables). The measuring device described herein may reduce the number of ports of an optical device needed to determine full characteristics of the fiber optic network so that the one or more ports may be allocated for expansion purposes or for independent testing. The measuring device may have a processor and a communication interface for automatically measuring the characteristics of the fiber optic network without a technician needing to physically couple a measuring device to the optical device. Thus, the measuring device enables automatic, periodic, on demand, and/or continuous monitoring of the fiber optic network.

Those skilled in the art will appreciate that digital equipment and/or analog equipment may be employed. One skilled in the art will appreciate that provided herein is a functional description and that the respective functions may be performed by software, hardware, or a combination of software and hardware.

FIG. 1 shows a system 100 that may be configured to provide communication services, such as content services and/or internet services, to a user device 102. The user device 102 may be in communication with a computing device 104 such as a server. The computing device 104 may be disposed locally or remotely relative to the user device 102. The user device 102 and the computing device 104 may be in communication via a private and/or public network 105 such as the Internet or a local area network. The network 105 may be an optical network (e.g., a fiber optic network). Other forms of communications may be used such as wired and wireless telecommunication channels.

The user device 102 may be an electronic device such as a computer, a smartphone, a laptop, a tablet, a set top box, a display device, or other device capable of communicating with the computing device 104. The user device 102 may have a communication element 106 for providing an interface to a user to interact with the user device 102 and/or the computing device 104. The communication element 106 may be any interface for presenting and/or receiving information to/from the user, such as user feedback. The interface may be a communication interface such as a web browser (e.g., Internet Explorer®, Mozilla Firefox®, Google Chrome®, Safari®, or the like). Other software, hardware, and/or interfaces may be used to provide communication between the user and one or more of the user device 102 and the computing device 104. The communication element 106 may request or query various files from a local source and/or a remote source. The communication element 106 may transmit data to a local or remote device such as the computing device 104.

The user device 102 may be associated with a user identifier or device identifier 108. The device identifier 108 may be any identifier, token, character, string, or the like, for differentiating one user or user device (e.g., user device 102) from another user or user device. The device identifier 108 may identify a user or user device as belonging to a particular class of users or user devices. The device identifier 108 may have information relating to the user device 102 such as a manufacturer, a model or type of device, a service provider associated with the user device 102, a state of the user device 102, a locator, and/or a label or classifier. Other information may be represented by the device identifier 108.

The device identifier 108 may have an address element 110 and a service element 112. The address element 110 may be or may provide an internet protocol address, a network address, a media access control (MAC) address, an Internet address, or the like. The address element 110 may be relied upon to establish a communication session between the user device 102, the computing device 104, the network device 118, and/or other devices and/or networks. The address element 110 may be used as an identifier or locator of the user device 102. The address element 110 may be persistent for a particular network.

The service element 112 may be an identification of a service provider associated with the user device 102 and/or with the class of user device 102. The class of the user device 102 may be related to a type of device, capability of device, type of service being provided, and/or a level of service (e.g., a business class, a service tier, a service package, etc.). The service element 112 may have information relating to or provided by a communication service provider (e.g., an Internet service provider) that may provide or may enable data flow such as communication services to the user device 102. The service element 112 may have information relating to a preferred service provider for one or more particular services relating to the user device 102. The address element 110 may be used to identify or retrieve data from the service element 112, or vice versa. One or more of the address element 110 and/or the service element 112 may be stored remotely from the user device 102 and retrieved by one or more devices such as the user device 102, the computing device 104, and/or the network device 118. Other information may be represented by the service element 112.

The computing device 104 may be a server for communicating with the user device 102. The computing device 104 may communicate with the user device 102 for providing data and/or services. The computing device 104 may provide services such as network (e.g., Internet) connectivity, network printing, media management (e.g., media server), content services, streaming services, broadband services, or other network-related services. The computing device 104 may allow the user device 102 to interact with remote resources such as data, devices, and files. The computing device 104 may be configured as (or disposed at) a central location (e.g., a headend, or processing facility), which may receive content (e.g., data, input programming) from multiple sources. The computing device 104 may combine the content from the multiple sources and may distribute the content to user (e.g., subscriber) locations via a distribution system.

The computing device 104 may manage the communication between the user device 102 and a database 114 for sending and receiving data therebetween. The database 114 may store a plurality of files (e.g., web pages), user identifiers or records, or other information. The user device 102 may request and/or retrieve a file from the database 114. The database 114 may store information relating to the user device 102 such as the address element 110 and/or the service element 112. The computing device 104 may obtain the device identifier 108 from the user device 102 and retrieve information from the database 114 such as the address element 110 and/or the service elements 112. The computing device 104 may obtain the address element 110 from the user device 102 and may retrieve the service element 112 from the database 114, or vice versa. Any information may be stored in and retrieved from the database 114. The database 114 may be disposed remotely from the computing device 104 and accessed via a direct or an indirect connection. The database 114 may be integrated with the computing system 104 or some other device or system.

The computing device 104 may be associated with an identifier 116. The identifier 116 may be any identifier, token, character, string, or the like, for differentiating one computing device (e.g., the computing device 104) from another computing device. The identifier 116 may identify the computing device 104 as belonging to a particular class of devices. The identifier 116 may have information relating to the computing device 104 such as a manufacturer, a model or type of device, a service provider associated with the computing device 104, a state of the computing device 104, a locator, and/or a label or classifier. Other information may be represented by the identifier 116.

One or more network devices 118 may be in communication with a network such as the network 105. One or more of the network devices 118 may facilitate the connection of a device, such as the user device 102, to the network 105. The network device 118 may be associated with an identifier 124. The identifier 124 may be any identifier, token, character, string, or the like, for differentiating one network device (e.g., the network device 118) from another network device. The identifier 124 may identify the network device 118 as belonging to a particular class of devices. The identifier 124 may have information relating to the network device 118 such as a manufacturer, a model or type of device, a service provider associated with the network device 118, a state of the network device 118, a locator, and/or a label or classifier. Other information may be represented by the identifier 124.

The network device 118 may have an optical device 120. The optical device 120 may have one or more ports. The optical device 120 may have an input port, an express port, an upgrade port, one or more test ports, and a common (COM) port. The optical device 120 may be a passive optical device that aggregates and/or separates wavelengths of light received from one or more optical links. That is, the optical device 120 may be a multiplex (MUX) device or a demultiplex (DMUX) device depending on the direction light travels through the optical device 120. The optical device 120 may have a common (COM) port that provides an interface to an optical link. The COM port may contain all of the aggregated wavelengths in the MUX capability or accept incoming wavelengths for separation for the DMUX capability. Stated differently, the optical device 120 may receive a plurality of wavelengths from a plurality of optical links via the input port and combine the plurality of wavelengths into a combined signal. The combined signal may be output by the optical device 120. The combined signal may be output to the COM port. The optical device 120 may receive a combined signal having a plurality of wavelengths via the COM port and may separate the plurality of wavelengths from the combined signal into a plurality of individual signals. The plurality of individual signals may be provided to a plurality of optical links via the input port for transmission over the optical network. Thus, in the DMUX configuration, the input port of the optical device 120 acts as an output port. Further, as will be appreciated by one skilled in the art, passive optical devices may be reciprocal. That is, the same device may aggregate more than one data signal (e.g., wavelengths), such as MUXing, as well as separating more than one data signal (e.g., wavelengths), such as DMUXing. Additionally, while a single optical device 120 is described for ease of explanation, the system 100 may have more than one optical device 120, and the more than one optical devices 120 may be located at different locations and may have different capabilities. A first optical device 120 may have a MUXing capability, while a second optical device 120 may have a DMUXing capability.

The optical device 120 may have one or more couplers. Each coupler may be configured to receive as input a combined signal and output two or more different power levels of the combined signal on two or more outputs. A coupler may output 50% of the combined signal on one output, and may output 50% of the combined signal on another output. A coupler may output 99% of the combined signal on one output, and 1% of the combined signal on another output. A coupler may output 98% of the combined signal on one output, and may output 2% of the combined signal on another output. While outputs totaling 100% are used for ease of explanation, a person skilled in the art would appreciate that any combination of outputs provided by the coupler may be used, including combinations below 100%.

The optical device 120 may have one or more Add-Drop Multiplexers (ADM). An ADM may receive the combined signal having a plurality of different wavelengths of light, and may drop (e.g., remove) a wavelength of light from the combined signal. The dropped (e.g., removed) wavelength of light may be provided on a first output. The first output of the ADM may be in communication with a test port of the optical device 120. The first output may be associated with an Optical Time Domain Reflectometer (OTDR). The OTDR may be a part of a measuring device (e.g., the measuring device 122 as will be explained below. The remaining combined signal may be provided on a second output. The second output may be in communication with the COM port of the optical device 120. The ADM may receive a second input signal. The second input signal may be at the same wavelength of light as the dropped signal. The ADM may add the second input signal to the remaining combined signal. The second input signal may be received by the ADM from the OTDR. The optical device 120 may receive an output signal from the OTDR on the test port of the optical device 120 that is in communication with the ADM.

The ADM may drop and/or add a wavelength of light outside of the wavelengths of light associated with data signals. The combined signal may be a plurality of wavelengths of light that are data signals ranging from 1200 nm to 1600 nm. The ADM may drop and/or add a wavelength of light that is greater than (e.g., higher than) the maximum wavelength of light for the data signals. The wavelength of light may be 1610 nm, 1611 nm, 1620 nm, and so forth.

By using a wavelength of light outside the wavelengths of light of the data signals, the wavelength of light may indicate problems associated with the network 105 before the data signals are impacted. In cold weather, a fiber optic network may have fiber optic cables freeze, which results in contracting of the fiber optic cables. The fiber optic cables may break if the fiber optic cables become cold enough, which may take a significant amount of time because the fiber optic cables may be insulated. However, wavelengths of light outside the data signals (e.g., higher wavelengths of light) may be impacted before the data signals. That is, as the fiber optic cable begins to contract (e.g., due to temperature), the outer wavelengths (e.g., larger wavelengths) of light will be impacted first because the outer wavelengths lose guiding earlier and experience interference from the contracting fiber optic cable prior to the data signals. Further, other events may occur that impact fiber optic cables such as a pole supporting the fiber optic cables falling down, which may damage but not fully break the fiber optic cables. Thus, the higher wavelengths of the light may be measured (e.g., by an OTDR) to detect potential problems with a fiber optic cable prior to the data signals being impacted. Therefore, a network provider associated with the fiber optic network (e.g., the network 105) may be able to proactively correct any issues with fiber optic cables before the data signals are impacted. While the optical device 120 is shown as being a part of the network device 118, a person skilled in the art would appreciate that the optical device 120 may be a separate from the network device 118.

The network device 118 may have a measuring device 122. The measuring device 122 may measure one or more characteristics of the network 105. The network 105 may be an optical network (e.g., a fiber optic network). The measuring device 122 may determine one or more data signals sent via the network 105, and the power of the network 105. The one or more data signals may be associated with a respective wavelength of light that is associated with a combined data signal having a plurality of wavelengths of light. While the measuring device 122 is shown as being a part of the network device 118 for ease of explanation, a person skilled in the art would appreciate the measuring device 122 may be external to the network device 118.

The measuring device 122 may have an Optical Spectrum Analyzers (OSA). The OSA may measure the data signals sent via the optical device 120. Each data signal may be associated with a respective wavelength of light. The OSA may measure the data signals sent in a first direction (e.g., forwards) through the optical device 120, and may measure the data signal sent in a second direction (e.g., backwards) through the optical device 120. The measuring device 122 may have an Optical Time Domain Reflectometer (OTDR) for measuring a power associated with the network 105. The OTDR may also indicate the continuity of a communication link and/or communication path associated with the network 105. The OTDR may send a test signal via a test port associated with the optical device 120. The test signal may be associated with a specific wavelength of light. The OTDR may utilize a wavelength outside (e.g., higher than) the wavelengths of light associated with the data signals. By utilizing a wavelength higher than the wavelength of light associated with the data signals, the OTDR may detect problems with the network 105 (e.g., power reduction) before the data signals are impacted. The measuring device 122 may have a switch (not shown). The measuring device may have an ADM in communication with the OSA and/or the OTDR.

The switch may be a 1 by X switch, where X is the number of input ports associated with the switch and the 1 relates to the number of outputs of the switch. The number of input ports may be determined based on a number of optical devices the switch may communicate with. The switch may be 2 by X switch, 3 by X switch, and so forth. The switch may not have the same number of ports as the input ports of the optical device 120. The switch may receive, as input, an output (e.g., a data signal) associated with a test port of the optical device 120, and provide the data signal to at least one of the OTDR, the OSA, and/or the ADM. The switch may provide the data signal to the ADM, and the ADM may provide a first output to the OTDR and a second output to the OSA. The first output may be a dropped signal associated with a specific wavelength of light, and the second output may be a remainder of the data signal.

The measuring device 122 may communicate (e.g., send and/or receive data) with the computing device 104. The measuring device 122 may communicate with the computing device 104 via the network 105 or another network. The measuring device 122 may send the measured one or more characteristics of the network 105 to the computing device 105. The measuring device 122 may take measurements of the network 105 in intervals (e.g., 1 ms, 1 s, 1 minute, 1 hour, etc.). The measuring device 122 may continuously take measurements of the network 105. The measuring device 122 may provide (e.g., send) these measurements to the computing device 104. The measuring device 122 may send the measurements in intervals. The measuring device 122 may send the measurements continuously.

The computing device 104 may receive the measured one or more characteristics of the network 105 from the measuring device 122. The computing device 104 may store the measured one or more characteristics of the network 105 in the database 114. The computing device 104 may determine one or more actions to take based on the measured characteristics. The computing device 104 may determine a notification to send based on the measured characteristic. The computing device 104 may determine an error in the network 105 and may send a notification based on the error to another computing device. The computing device 104 may determine a report based on the measured characteristics. The computing device 104 may receive a plurality of measurements from a plurality of measurement device 122. The computing device 104 may determine a report based on the plurality of measurements. The report may indicate a status (e.g., the health) of the network 105. The report may indicate one or more errors (e.g., faults) in the network 105. The computing device 104 may determine a notification based on the report. The computing device 104 may determine an inventory of wavelengths and fiber assets, fiber capacity tools, tuning wavelengths, or proactively monitoring the attributes of the wavelengths to discover faults based on the plurality of measurements.

Figure 2:
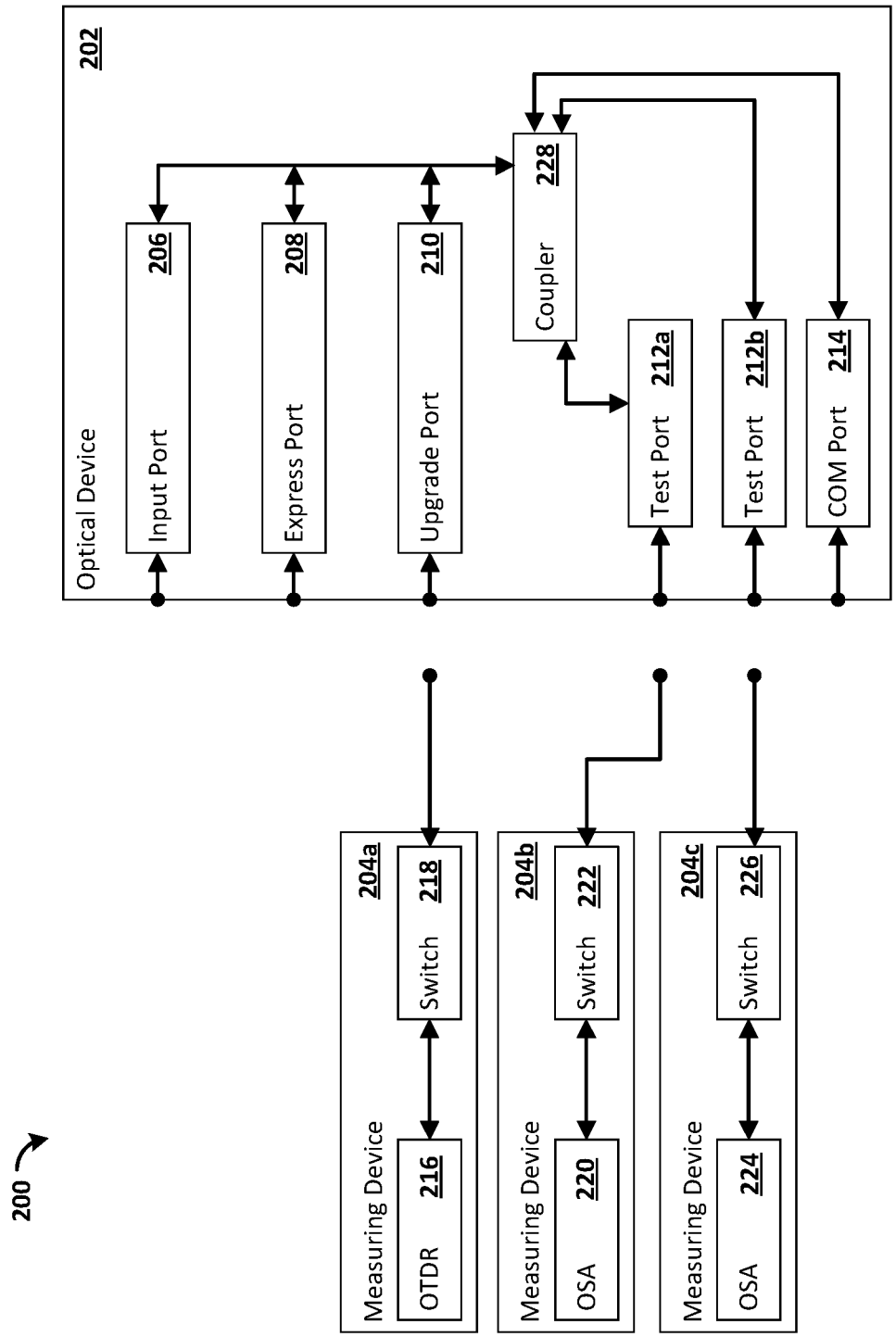
FIG. 2 shows a system for monitoring optical networks.

FIG. 2 shows a system 200 for monitoring a network. The system 200 may have an optical device 202 (e.g., the optical device 120 of FIG. 1), and measuring devices 204a,b,c (e.g., the measuring device 122 of FIG. 1). The system 200 may monitor an optical network (e.g., a fiber optic network). While a single optical device 202 and three measuring devices 204a,b,c are shown for ease of explanation, a person skilled in the art would appreciate that the system 200 may have any number of optical devices 202 and measuring devices 204. The optical device 202 may be a passive optical device.

The optical device 202 may have an input port 206. The input port 206 may receive one or more data signals via one or more optical links. The data signals may be optical data signals. Each of the data signals may be associated with a respective wavelength of light. Each of the optical links may have an associated wavelength of light (e.g., data signal). The input port 206 may have a plurality of ports (not shown) in communication with the one or more optical links. That is, the input port 206 may have a separate port associated with each optical link. The input port 206 may aggregate wavelengths of light received from the one or more optical links. The input port 206 may receive the data signals (e.g., the wavelengths of light) via the one or more optical links. The input port 206 may combine the received data signals into a single combined data signal. The input port 206 may transmit the combined data signal to another component (e.g., the coupler 228) of the optical device 202 via a communications path. The express port 208 and/or the upgrade port 210 may also transmit data signals to the coupler 228 via the communication path. That is, the input port 206, the express port 208, and the upgrade port 210 may utilize the same communication path to communicate with (e.g., transmit and/or receive data signals) the coupler 228. Thus, the input port 206 may be a multiplex (MUX) if the input port 206 receives a plurality of data signals. The input port 206 may utilize wavelengths of light ranging from 1200 nm to 1600 nm.

The input port 206 may separate wavelengths of light from a combined data signal (e.g., received from the coupler 228). The input port 206 may separate the combined data signal into one or more separate data signals (e.g., wavelengths of light). The input port 206 may separate the combined data signal into one or more separate data signals. The input port 206 may be an output port that outputs the separated data signals on the optical links associated with the input port 206. The input port 206 may transmit the separated data signals to respective optical links. Thus, the input port 206 may be a demultiplex (DMUX) if the input port 206 receives a single combined data signal. The express port 208 and the upgrade port 210 may also receive the combined data signal from the coupler 228, and output the combined data signal. While the optical device 202 is described as either DMUXing or MUXing, a person skilled in the art would appreciate that the optical device 202 may be capable of MUXing and DMUXing light concurrently depending on the direction of the signal flow. That is, the input port 206 may be an input for a first wavelength of light and may concurrently be an output for a second wavelength of light.

The optical device 202 may have an express port 208 and an upgrade port 210. The express port 208 and the upgrade port 210 may be in communication with the input port 206. The express port 208 and the upgrade port 210 may support additional wavelengths of light (e.g., outside the wavelengths of light associated with the input port 206) that the optical device 202 may utilize. The express port 208 may utilize wavelengths associated with a Conventional (C) band. The C band may have wavelengths of light ranging from 1530-1565 nm. The upgrade port 210 may utilize wavelengths of light associated with bands other than the C band. The upgrade port 210 may utilize the Long Wavelengths (L) band that has wavelengths of light ranging from 1565-1625 nm, and the Ultra-Long Wavelengths (U) band that has wavelengths of light ranging from 1625-1675 nm. While the express port 208 and the upgrade port 210 are shown as separate ports for ease of explanation, a person skilled in the art would appreciate that the input port 206 may have the capability of the express port 208 and the upgrade port 210.

The optical device 202 may have test ports 212a and 212b. The test ports 212a,b may allow a measuring device (e.g., the measuring devices 204a,b,c) to measure (e.g., test) data signals sent via the optical device 202. The measuring device may determine a power level, power spectral density, and one or more wavelengths associated with the data signals. The measuring device may measure one or more characteristics of the optical network. The measuring device may determine a power level associated with the data signals in both the forward and reverse direction at each specific wavelength or in each specific channel passband. Further, while a single optical device 210 is shown for ease of explanation, each of the measuring devices 204a,b,c may be in communication with more than one optical device.

The optical device 202 may have a common (COM) port 214 that provides an interface to an optical link. The COM port 214 may receive the combined data signal provided by the input port 206. The COM port 214 may output the combined data signal on an optical link associated with the COM port 214. The COM port 214 may receive a data signal (e.g., a combined data signal having a plurality of wavelengths of light) from the optical link and provide the data signal to the input port 206 for the input port 206 to separate out wavelengths of light associated with the data signal.

The measuring device 204a may have an Optical Time Domain Reflectometer (OTDR) 216 and a switch 218. The OTDR 216 may measure a power associated with an optical network (e.g., the network 105 of FIG. 1). The OTDR 216 may measure a continuity of a communication link and/or communication path of the optical network (e.g., the network 105 of FIG. 1). The OTDR 216 may send a test signal via a test port or via the upgrade port associated with the optical device 202. The test signal may be associated with a specific wavelength of light. The OTDR 216 may utilize a wavelength outside (e.g., higher than) the wavelengths of light associated with the data signals received by the optical device 202. By utilizing a wavelength higher than the wavelength of light associated with the data signals, the OTDR 216 may detect problems (e.g., power reduction) with the network before the data signals are impacted.

The switch 218 may be a 1 by X switch, where X is the number of input ports and the 1 relates to the number of outputs of the switch. The number of input ports may be determined based on a number of optical devices (e.g., one or more of the optical devices 202 or other optical devices) the switch 218 may communicate with. The switch 218 may be a 1 by 48 switch. The switch 218 may be 2 by X switch, 3 by X switch, and so forth. The switch 218 may receive, as input, an output (e.g., a data signal) associated with a test port of the optical device 202 (e.g., the express port 208, the upgrade port 210, and/or the test ports 212). The switch 218 may send the received signal to the OTDR 216. The switch 218 may send an output to the test port of the optical device 202. The switch 218 may receive a signal from the OTDR 216 and send the signal to the test port of the optical device 202. The switch 218 may receive a signal from and/or send the signal to the upgrade port 210.

The measuring device 204b may have an Optical Spectrum Analyzer (OSA) 220 and a switch 222. The OSA 220 may measure the data signals sent via the optical device 202. Each data signal may be associated with a respective wavelength of light. The OSA 220 may measure the data signals sent in a first direction (e.g., forwards) through the optical device 202, and may measure the data signal sent in a second direction (e.g., backwards) through the optical device 202.

The switch 222 may be a 1 by X switch, where X is the number of input ports and the 1 relates to the number of outputs of the switch. The number of input ports may be determined based on a number of optical devices (e.g., one or more of the optical devices 202 or other optical devices) the switch 222 may communicate with. The switch 222 may be a 1 by 48 switch. The switch 222 may be 2 by X switch, 3 by X switch, and so forth. The switch 222 may receive as input an output (e.g., a data signal) associated with a test port of the optical device 202 (e.g., the express port 208, the upgrade port 210, and/or the test ports 212). The switch 222 may send the received signal to the OSA 220. The switch 222 may receive a signal from the test port 212a.

The measuring device 204c may have an Optical Spectrum Analyzer (OSA) 224 and a switch 226. The OSA 224 may measure the data signals sent via the optical device 202. Each data signal may be associated with a respective wavelength of light. The OSA 224 may measure the data signals sent in a first direction (e.g., forwards) through the optical device 202, and may measure the data signal sent in a second direction (e.g., backwards) through the optical device 202. The OSA 224 of the measuring device 204c may measure the data signals sent in a first direction, and the OSA 220 of the measuring device 204b may measure the data signal sent in a second direction.

The switch 226 may be a 1 by X switch, where X is the number of input ports and the 1 relates to the number of outputs of the switch. The number of input ports may be determined based on a number of optical devices (e.g., one or more of the optical devices 202 or other optical devices) the switch 226 may communicate with. The switch 226 may be a 1 by 48 switch. The switch 226 may be 2 by X switch, 3 by X switch, and so forth. The switch 226 may receive as input an output (e.g., a data signal) associated with a test port of the optical device 202 (e.g., the express port 208, the upgrade port 210, and/or the test ports 212). The switch 226 may send the received signal to the OSA 224. The switch 226 may receive a signal from the test port 212b.

The optical device 202 may have a coupler 228. The coupler 228 may receive as input a combined signal (e.g., from the input port 206, the express port 208, the upgrade port 210, and/or the COM port 214) and output two or more different power levels of the combined signal on two or more outputs. The coupler 228 may be a 2×2 coupler. That is, the coupler 228 may have two inputs and two outputs.

The coupler 228 may receive an input from the input port 206. The coupler 228 may provide a first output to the test port 212b and a second output to the COM port 214. The coupler 228 may output 99% of the combined signal on the second output, and 1% of the combined signal on the first output. The coupler 228 may output 98% of the combined signal on the second output, and may output 2% of the combined signal on the first output.

The coupler 228 may receive an input from the COM port 214. The coupler 228 may provide a first output to the test port 212a and a second output to the input port 206. The coupler 228 may output 99% of the combined signal on the second output, and 1% of the combined signal on the first output. The coupler 228 may output 98% of the combined signal on the second output, and may output 2% of the combined signal on the first output. The 98%:2% coupler may increase the test point by 3 dB, which may help with obtaining better measurements of the data signal, as well as allowing for further splitting of the data signal. While outputs totaling 100% are used for ease of explanation, a person skilled in the art would appreciate that any combination of outputs provided by the coupler may be used, including combinations below 100%.

Figure 3:
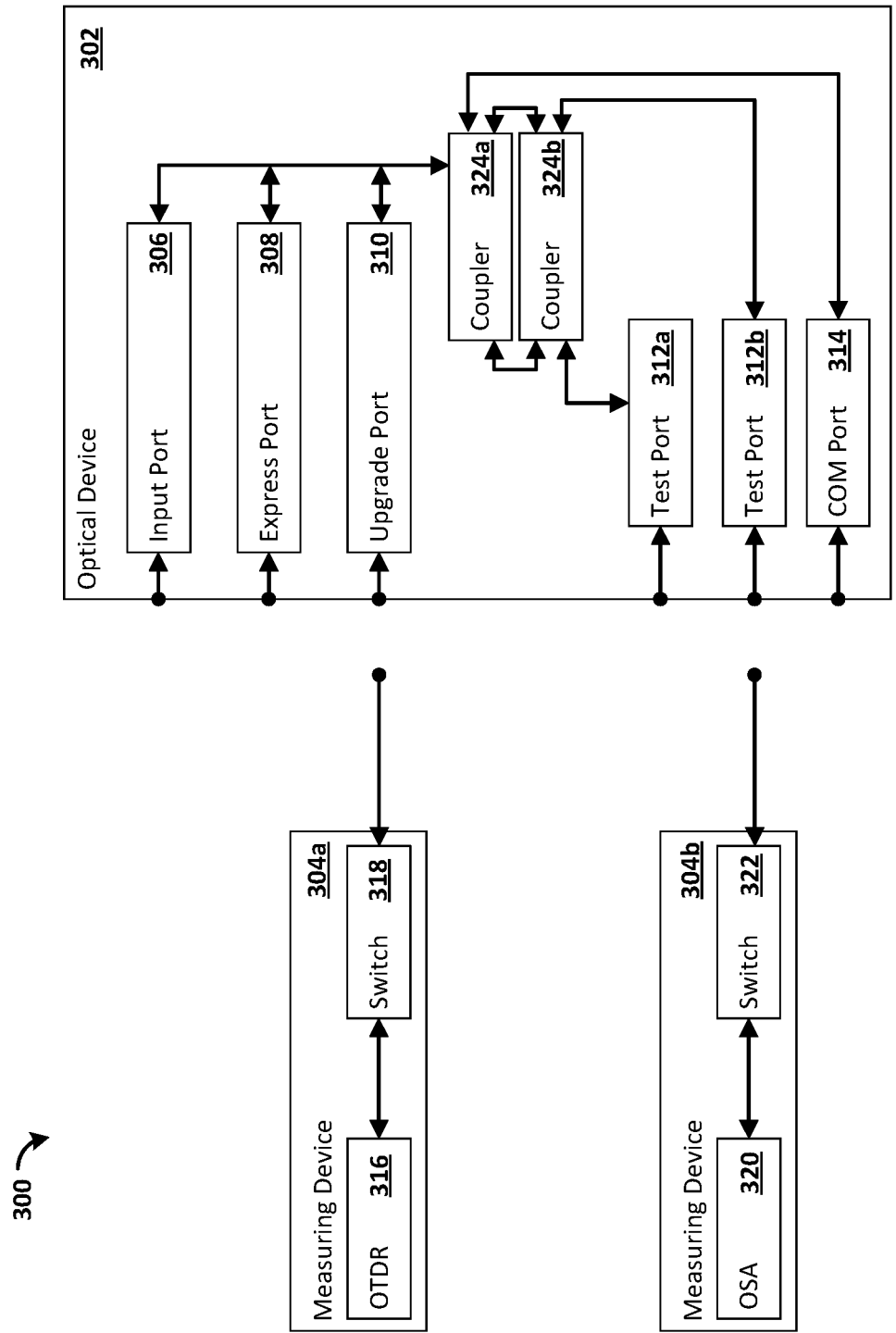
FIG. 3 shows a system for monitoring optical networks.

FIG. 3 shows a system 300 for monitoring a network. The system 300 may have an optical device 302 (e.g., the optical device 120 of FIG. 1), and measuring devices 304a and 304b (e.g., the measuring device 122 of FIG. 1). The system 300 may monitor an optical network (e.g., a fiber optic network). While a single optical device 302 and two measuring devices 304a and 304b are shown for ease of explanation, a person skilled in the art would appreciate that the system 300 may have any number of optical devices 302 and measuring devices 304. The measuring devices 304 may be in communication with a plurality of optical devices 302 (e.g., 2, 5, 50, 100, 500, etc.). The optical device 302 may be a passive optical device.

The optical device 302 may have an input port 306. The input port 306 may receive one or more data signals via one or more communication links. The communication links may be optical links. The data signals may be optical data signals. Each of the data signals may be associated with a respective wavelength of light. Each of the optical links may have an associated wavelength of light (e.g., data signal). The input port 306 may have a plurality of ports (not shown) in communication with the one or more optical links. That is, the input port 306 may have a separate port associated with each optical link. The input port 306 may aggregate wavelengths of light received from the one or more optical links. The input port 306 may receive the data signals (e.g., the wavelengths of light) via the one or more optical links. The input port 306 may combine the received data signals into a single combined data signal. The input port 306 may transmit the combined data signal (e.g., to the coupler 328). Thus, the input port 306 may have the capability to be a multiplex (MUX) if input port 306 receives a plurality of data signals. The input port 306 may utilize wavelengths of light ranging from 1200 nm to 1600 nm. Further, the express port 308 and the upgrade port 310 may add one or more data signals to the combined data signal.

The input port 306 may separate wavelengths of light from a combined data signal. The input port 306, the express port 308, and/or the upgrade port 310 may receive the combined data signal (e.g., from the coupler 324*a*). The input port 306 may separate the combined data signal into one or more separate data signals (e.g., wavelengths of light). The input port 306 may separate the combined data signal into one or more separate data signals. The input port 306 may be an output port that outputs the separated data signals on the optical links associated with the input port 306. The input port 306 may transmit the separated data signals to respective optical links. Thus, the input port 306 may have the capability to be a demultiplex (DMUX) if the input port 306 receives a single combined data signal.

The optical device 302 may have an express port 308 and an upgrade port 310. The express port 308 and the upgrade port 310 may be in communication with the input port 306. The input port 306 may provide received data signals to other components of the optical device 302 (e.g., a coupler 324*a*). The express port 308 and the upgrade port 310 may provide additional wavelengths of light (e.g., outside the wavelengths of light associated with the input port 306) that the optical device 302 may utilize. The express port 308 may utilize wavelengths associated with a Conventional (C) band. The C band may have wavelengths of light ranging from 1530-1565 nm. The upgrade port 310 may utilize wavelengths of light associated with bands other than the C band. The upgrade port 310 may utilize the Long Wavelengths (L) band that has wavelengths of light ranging from 1565-1625 nm, and the Ultra-Long Wavelengths (U) band that has wavelengths of light ranging from 1625-1675 nm. While the express port 308 and the upgrade port 310 are shown as separate ports for ease of explanation, a person skilled in the art would appreciate that the input port 306 may have the capability of the express port 308 and the upgrade port 310.

The optical device 302 may have test ports 312*a* and 312*b*. The test ports 312*a,b* may allow a measuring device (e.g., the measuring devices 304*a* and 304*b*) to measure (e.g., test) data signals sent via the optical device 302. Stated differently, the test ports 312*a,b* may output one or more data signals that are sent via the optical device 302 to allow the measuring device to determine one or more characteristics of the optical network. Accordingly, the measuring device may utilize the tests ports 312*a,b* to determine one or more characteristics of the optical network. The measuring device may determine a power level, power spectral density, and one or more wavelengths associated with the data signals. The measuring device may determine a power level associated with the data signals in both the forward and reverse direction at each specific wavelength or in each specific channel passband.

The optical device 302 may have a common (COM) port 314 that provides an interface to an optical link. The COM port 314 may receive the combined data signal provided by the input port 306, the express port 308, and/or the upgrade port 310. The COM port 314 may output the combined data signal on an optical link associated with the COM port 314. The COM port 314 may receive a data signal (e.g., a combined data signal having a plurality of wavelengths of light) from the optical link and provide the data signal to the input port 306 for the input port 306 to separate out wavelengths of light associated with the data signal.

The measuring device 304*a* may have an Optical Time Domain Reflectometer (OTDR) 316 and a switch 318. The OTDR 316 may measure a power associated with an optical network (e.g., the network 105 of FIG. 1). The OTDR 316 may measure a continuity of a communication link and/or communication path of the optical network (e.g., the network 105 of FIG. 1). The OTDR 316 may send a test signal via a test port associated with the optical device 302. The OTDR 316 may send a test signal via the upgrade port 310. The test signal may be associated with a specific wavelength of light. The OTDR 316 may utilize a wavelength outside (e.g., higher than) the wavelengths of light associated with the data signals received by the optical device 302. By utilizing a wavelength higher than the wavelength of light associated with the data signals, the OTDR 316 may detect problems (e.g., power reduction) with the network before the data signals are impacted.

The switch 318 may be a 1 by X switch, where X is the number of input ports and the 1 relates to the number of outputs of the switch. The number of input ports may be determined based on a number of optical devices (e.g., one or more of the optical devices 302 or other optical devices) the switch 318 may communicate with. The switch 318 may be a 1 by 48 switch. The switch 318 may be 2 by X switch, 3 by X switch, and so forth. The switch 318 may receive as input an output (e.g., a data signal) associated with a test port of the optical device 302. The switch 318 may send the received signal to the OTDR 316. The switch 318 may send an output to the test port of the optical device 302 (e.g., the express port 308, the upgrade port 310, and/or the test ports 312). The switch 318 may receive a signal from the OTDR 316 and send the signal to a test port of the optical device 302. The switch 318 may receive a signal from and/or send the signal to the upgrade port 310.

The measuring device 304*b* may have an Optical Spectrum Analyzers (OSA) 320 and a switch 322. The OSA 320 may measure the data signals sent via the optical device 302. Each data signal may be associated with a respective wavelength of light. The OSA 320 may measure the data signals sent in a first direction (e.g., forwards) through the optical device 302, and may measure the data signal sent in a second direction (e.g., backwards) through the optical device 302. Thus, the OSA 320 allows for a test port (e.g., the test port 312*a* or test port 312*b*) to be available for adhoc testing while the measuring device 304*b* utilizes the remaining test port for testing.

The switch 322 may be a 1 by X switch, where X is the number of input ports and the 1 relates to the number of outputs of the switch. The number of input ports may be determined based on a number of optical devices (e.g., one or more of the optical devices 302 or other optical devices) the switch 322 may communicate with. The switch 322 may be a 1 by 48 switch. The switch 322 may be 2 by X switch, 3 by X switch, and so forth. The switch 322 may receive as input an output (e.g., a data signal) associated with a test port of the optical device 302 (e.g., the express port 308, the upgrade port 310, and/or the test ports 312). The switch 322 may send the received signal to the OSA 320. The switch 322 may receive a signal from the test port 312b.

The optical device 302 may have coupler 324a and 324b. The coupler 324a may receive as input a combined signal (e.g., from the input port 306, the express port 308, the upgrade port 310, and/or the COM port 314) and output two or more different power levels of the combined signal on two or more outputs. The coupler 324a may be a 2×2 coupler. That is, the coupler 324a may have two inputs and two outputs.

The coupler 324a may receive an input from the input port 306. The coupler 324a may provide a first output to the coupler 324b and a second output to the COM port 314. The coupler 324a may output 99% of the combined signal on the second output, and 1% of the combined signal on the first output. The coupler 324a may output 98% of the combined signal on the second output, and may output 2% of the combined signal on the first output.

The coupler 324a may receive an input from the COM port 314. The coupler 324a may provide a first output to the coupler 324b and a second output to the input port 306, the express port 308, and/or the upgrade port 310. The coupler 324a may output 99% of the combined signal on the second output, and 1% of the combined signal on the first output. The coupler 324a may output 98% of the combined signal on the second output, and may output 2% of the combined signal on the first output. While outputs totaling 100% are used for ease of explanation, a person skilled in the art would appreciate that any combination of outputs provided by the coupler may be used, including combinations below 100%.

The coupler 324b may receive as input a signal (e.g., from the coupler 324a) and output two or more different power levels of the combined signal on two or more outputs. The coupler 324b may be a 2×2 coupler. That is, the coupler 324b may have two inputs and two outputs. The coupler 324b may be in communication with the test ports 312a and 312b. The coupler 324b may receive an input from the coupler 324a. The coupler 324b may provide a first output to the test port 312a and a second output to the test port 312b. The coupler 324b may output 50% of the combined signal on the second output, and 50% of the combined signal on the first output. As will be appreciated by one skilled in the art, the percentages may not be exactly even due to imperfections in manufacturing and/or operating conditions. Further, while outputs totaling 100% are used for ease of explanation, a person skilled in the art would appreciate that any combination of outputs provided by the coupler may be used, including combinations below 100%.

The system 300 is capable of reducing the number of measuring devices 304 due to the addition of the coupler 324b to the optical device 202. The coupler 324b allows one measuring device (e.g., the measuring device 304b) to measure data signals in the forward direction, as well as the reverse direction, whereas FIG. 2 may require a separate measuring device for the forward direction and a separate measuring device for the reverse direction. Thus, the test port 312a may be not need to be utilized by a measuring device to measure all characteristics of the optical network, but could be used for another test device such as a portable measurement device without a switch. The system 300 has the same capabilities as system 200 but without using all of the test ports of the optical device 302.

Figure 4:
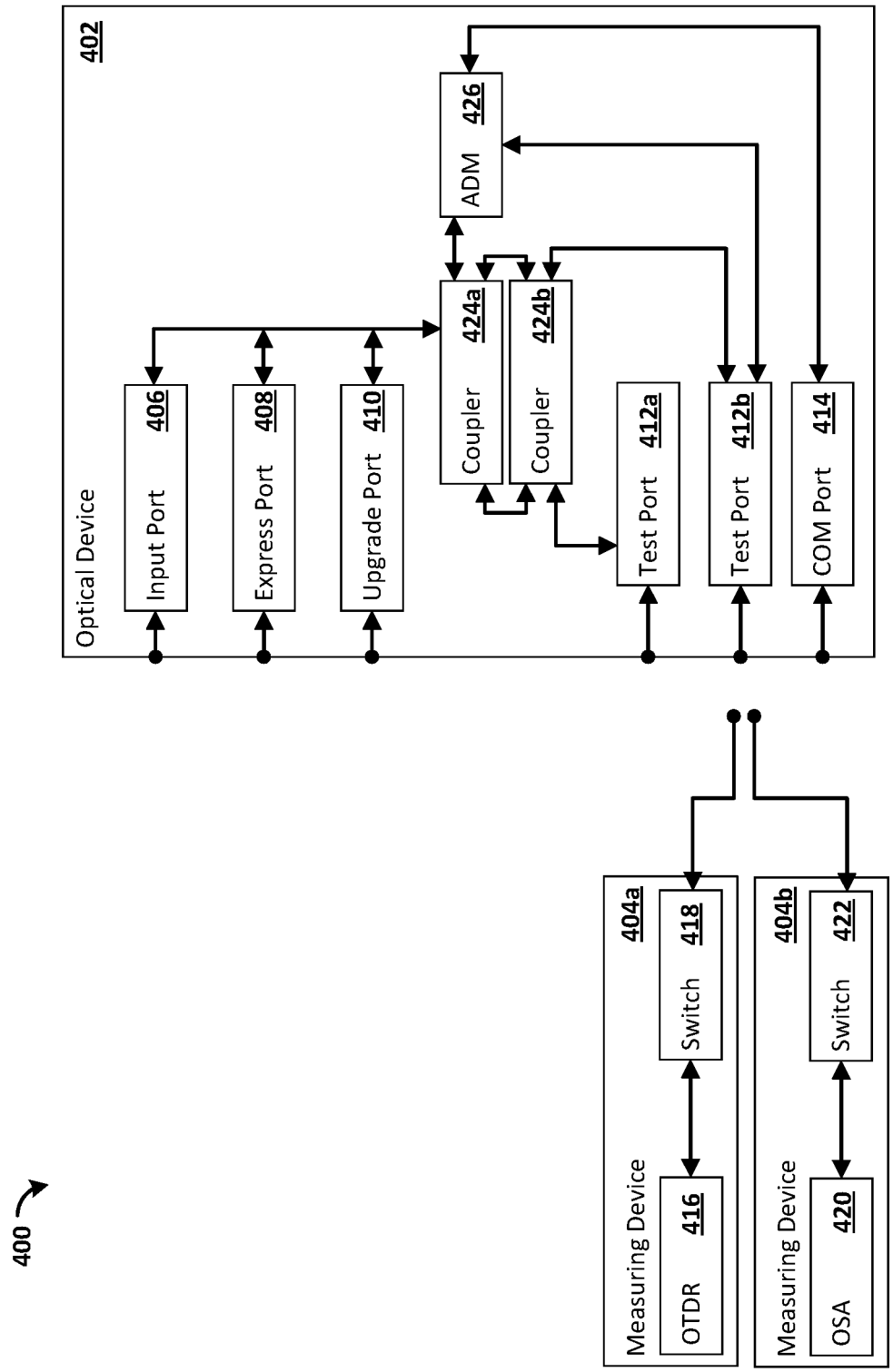
FIG. 4 shows a system for monitoring optical networks.

FIG. 4 shows a system 400 for monitoring a network. The system 400 may have an optical device 402 (e.g., the optical device 120 of FIG. 1), and measuring devices 404a and 404b (e.g., the measuring device 122 of FIG. 1). The system 400 may monitor an optical network (e.g., a fiber optic network). While a single optical device 402 and two measuring devices 404a and 404b are shown for ease of explanation, a person skilled in the art would appreciate that the system 400 may have any number of optical devices 402 and measuring devices 404. The measuring devices 404 may be in communication with a plurality of optical devices 302 (e.g., 2, 5, 50, 100, 500, etc.). The optical device 402 may be a passive optical device.

The optical device 402 may have an input port 406. The input port 406 may receive one or more data signals via one or more optical links. The data signals may be optical data signals. Each of the data signals may be associated with a respective wavelength of light. Each of the optical links may have an associated wavelength of light (e.g., data signal). The input port 406 may have a plurality of ports (not shown) in communication with the one or more optical links. That is, the input port 406 may have a separate port associated with each optical link. The input port 406 may aggregate wavelengths of light received from the one or more optical links. The input port 406 may receive the data signals (e.g., the wavelengths of light) via the one or more optical links. The input port 406 may combine the received data signals into a single combined data signal. The input port 406 may transmit the combined data signal (e.g., to the coupler 428). Thus, the input port 406 may have the capability to be a multiplex (MUX) if input port 406 receives a plurality of data signals. The input port 406 may utilize wavelengths of light ranging from 1200 nm to 1600 nm. Further, the express port 408 and the upgrade port 410 may add one or more data signals to the combined data signal.

The input port 406 may separate wavelengths of light from a combined data signal. The input port 406, the express port 408, and/or the upgrade port 410 may receive the combined data signal (e.g., from the coupler 424a). The input port 406 may separate the combined data signal into one or more separate data signals (e.g., wavelengths of light). The input port 406 may separate the combined data signal into one or more separate data signals. The input port 406 may be an output port that outputs the separated data signals on the optical links associated with the input port 406. The input port 406 may transmit the separated data signals to respective optical links. Thus, the input port 406 may have the capability to be a demultiplex (DMUX) if the input port 406 receives a single combined data signal.

The optical device 402 may have an express port 408 and an upgrade port 410. The express port 408 and the upgrade port 410 may be in communication with the input port 406. The input port 406 may provide received data signals to other components of the optical device 402 (e.g., a coupler 424a). The express port 408 and the upgrade port 410 may provide additional wavelengths of light (e.g., outside the wavelengths of light associated with the input port 406) that the optical device 402 may utilize. The express port 408 may utilize wavelengths associated with a Conventional (C) band. The C band may have wavelengths of light ranging from 1530-1565 nm. The upgrade port 410 may utilize wavelengths of light associated with bands other than the C band. The upgrade port 410 may utilize the Long Wavelengths (L) band that has wavelengths of light ranging from 1565-1625 nm, and the Ultra-Long Wavelengths (U) band that has wavelengths of light ranging from 1625-1675 nm. While the express port 408 and the upgrade port 410 are shown as separate ports for ease of explanation, a person skilled in the art would appreciate that the input port 406 may have the capability of the express port 408 and the upgrade port 410.

The optical device 402 may have test ports 412*a* and 412*b*. The test ports 412*a,b* may allow a measuring device (e.g., the measuring devices 404*a* and 404*b*) to measure (e.g., test) data signals sent via the optical device 402. Stated differently, the test ports 412*a,b* may output one or more data signals that are sent via the optical device 402 to allow the measuring device to determine one or more characteristics of the optical network. Accordingly, the measuring device may utilize the tests ports 412*a,b* to determine one or more characteristics of the optical network. The measuring device may determine a power level, power spectral density, and one or more wavelengths associated with the data signals. The measuring device may determine a power level associated with the data signals in both the forward and reverse direction at each specific wavelength or in each specific channel passband.

The optical device 402 may have a common (COM) port 414 that provides an interface to an optical link. The COM port 414 may receive the combined data signal provided by the input port 406, the express port 408, and/or the upgrade port 410. The COM port 414 may output the combined data signal on an optical link associated with the COM port 414. The COM port 414 may receive a data signal (e.g., a combined data signal having a plurality of wavelengths of light) from the optical link and provide the data signal to the input port 406 for the input port 406 to separate out wavelengths of light associated with the data signal.

The measuring device 404*a* may have an Optical Time Domain Reflectometer (OTDR) 416 and a switch 418. The OTDR 416 may measure a power associated with an optical network (e.g., the network 105 of FIG. 1). The OTDR 416 may measure a continuity of a communication link and/or communication path of the optical network (e.g., the network 105 of FIG. 1). The OTDR 416 may send a test signal via a test port associated with the optical device 402. The test signal may be associated with a specific wavelength of light. The OTDR 416 may utilize a wavelength outside (e.g., higher than) the wavelengths of light associated with the data signals received by the optical device 402. By utilizing a wavelength higher than the wavelength of light associated with the data signals, the OTDR 416 may detect problems (e.g., power reduction) with the network before the data signals are impacted.

The switch 418 may be a 1 by X switch, where X is the number of input ports and the 1 relates to the number of outputs of the switch. The number of input ports may be determined based on a number of optical devices (e.g., one or more of the optical devices 402 or other optical devices) the switch 418 may communicate with. The switch 418 may be a 1 by 48 switch. The switch 418 may be 2 by X switch, 3 by X switch, and so forth. The switch 418 may receive as input an output (e.g., a data signal) associated with a test port of the optical device 402. The switch 418 may send the received signal to the OTDR 416. The switch 418 may send an output to a test port (e.g., the test ports 412*a,b*). The switch 418 may receive a signal from the OTDR 416 and send the signal to a test port of the optical device 402 (e.g., the express port 408, the upgrade port 410, and/or the test ports 412). The switch 418 may receive a signal from and/or send the signal to the test port (e.g., the test ports 412*a,b*).

The measuring device 404*b* may have an Optical Spectrum Analyzers (OSA) 420 and a switch 422. The OSA 420 may measure the data signals sent via the optical device 402. Each data signal may be associated with a respective wavelength of light. The OSA 420 may measure the data signals sent in a first direction (e.g., forwards) through the optical device 402, and may measure the data signal sent in a second direction (e.g., backwards) through the optical device 402. That is, the OSA 420 may be capable of measuring data signals sent both forwards and backwards.

The switch 422 may be a 1 by X switch, where X is the number of input ports and the 1 relates to the number of outputs of the switch. The number of input ports may be determined based on a number of optical devices (e.g., one or more of the optical devices 402 or other optical devices) the switch 422 may communicate with. The switch 422 may be a 1 by 48 switch. The switch 422 may be 2 by X switch, 3 by X switch, and so forth. The switch 422 may receive as input an output (e.g., a data signal) associated with a test port of the optical device 402 (e.g., the express port 408, the upgrade port 410, and/or the test ports 412). The switch 422 may send the received signal to the OSA 420. The switch 422 may receive a signal from the test port 412*b*. The system 400 may use a jumper so that the measuring devices 404 may communicate with both ports (e.g., the test port 412*a* or the test port 412*b*).

The optical device 402 may have coupler 424*a* and 424*b*. The coupler 424*a* may receive as input a combined signal (e.g., from the input port 406, the express port 308, the upgrade port 410, and/or the COM port 414) and output two or more different power levels of the combined signal on two or more outputs. The coupler 424*a* may be a 2×2 coupler. That is, the coupler 424*a* may have two inputs and two outputs.

The coupler 424*a* may receive an input from the input port 406. The coupler 424*a* may provide a first output to the coupler 424*b* and a second output to an ADM 426. The coupler 424*a* may output 99% of the combined signal on the second output, and 1% of the combined signal on the first output. The coupler 424*a* may output 98% of the combined signal on the second output, and may output 2% of the combined signal on the first output.

The coupler 424*a* may receive an input from the ADM 426. The coupler 424*a* may provide a first output to the coupler 424*b* and a second output to the input port 406. The coupler 424*a* may output 99% of the combined signal on the second output, and 1% of the combined signal on the first output. The coupler 424*a* may output 98% of the combined signal on the second output, and may output 2% of the combined signal on the first output. While outputs totaling 100% are used for ease of explanation, a person skilled in the art would appreciate that any combination of outputs provided by the coupler may be used, including combinations below 100%.

The coupler 424*b* may receive as input a signal (e.g., from the coupler 424*a*) and output two or more different power levels of the combined signal on two or more outputs. The coupler 424*b* may be a 2×2 coupler. That is, the coupler 424*b* may have two inputs and two outputs. The coupler 424*b* may be in communication with the test ports 412*a* and 412*b*. The coupler 424*b* may receive an input from the coupler 424*a*. The coupler 424*b* may provide a first output to the test port 412*a* and a second output to the test port 412*b*. The coupler 424*b* may output 50% of the combined signal on the second output, and 50% of the combined signal on the first output. As will be appreciated by one skilled in the art, the percentages may not be exactly even due to imperfections in manufacturing and/or operating conditions. Further, while outputs totaling 100% are used for ease of explanation, a person skilled in the art would appreciate that any combination of outputs provided by the coupler may be used, including combinations below 100%.

The optical device 402 may have one or more Add-Drop Multiplexers (ADM) 426. The ADM 426 may be in communication with a test port (e.g., the test ports 412*a,b*), the COM port 414, and the coupler 424*a*. The ADM 426 may have an input, an output, and an add/drop output. The ADM 426 may receive a combined signal (e.g., from the coupler 424*a*, from the COM port 414) that has a plurality of different wavelengths of light, and may drop (e.g., remove) a wavelength of light from the combined signal. The dropped (e.g., removed) wavelength of light may be provided on the add/drop output. The add/drop output of the ADM 426 may be in communication with a test port (e.g., the test ports 412*a,b*). The remaining combined signal may be provided on the output. The output may be in communication with the COM port 414 and/or the coupler 424*a*. The ADM 426 may receive (e.g., from the test ports 412*a,b*) an input signal via the add/drop output. The input signal via the add/drop output may be at the same wavelength of light as the dropped signal. The ADM 426 may add the input signal receive via the add/drop output to the remaining combined signal. The input signal receive via the add/drop output may be received by the ADM 426 from a measuring device (e.g., the measuring device 404*a*) via a test port (e.g., the test ports 412*a,b*). The ADM may drop and/or add a wavelength of light outside of the wavelengths of light associated with data signals. The combined signal may have a plurality of wavelengths of light that are data signals ranging from 1200 nm to 1600 nm. The ADM may drop and/or add a wavelength of light that is greater than (e.g., higher than) the maximum wavelength of light for the data signals. The wavelength of light may be 1610 nm, 1611 nm, 1620 nm, and so forth.

The system 400 is capable of reducing the number of ports utilized to measure the characteristics of the optical network (e.g., the network 105) due to the addition of the ADM 426 to the optical device 402. The ADM 426 allows a single test port (e.g., the test port 412*b*) to be utilized for OTDR 416 independent of the upgrade port 410, whereas FIG. 3 may require two separate ports (e.g., upgrade port 310 and/or one of the test ports 312*a,b*). Thus, the upgrade port 410 and the test port 412*a* may not need to be utilized by a measuring device to measure all characteristics of the optical network so the upgrade port 410 may be used for its primary purpose, while an adhoc test port (e.g., test port 412*a,b*) for forward and reverse measurement is available. The system 400 has the same capabilities as system 300 but without using the upgrade port 410 of the optical device 402.

Figure 5:
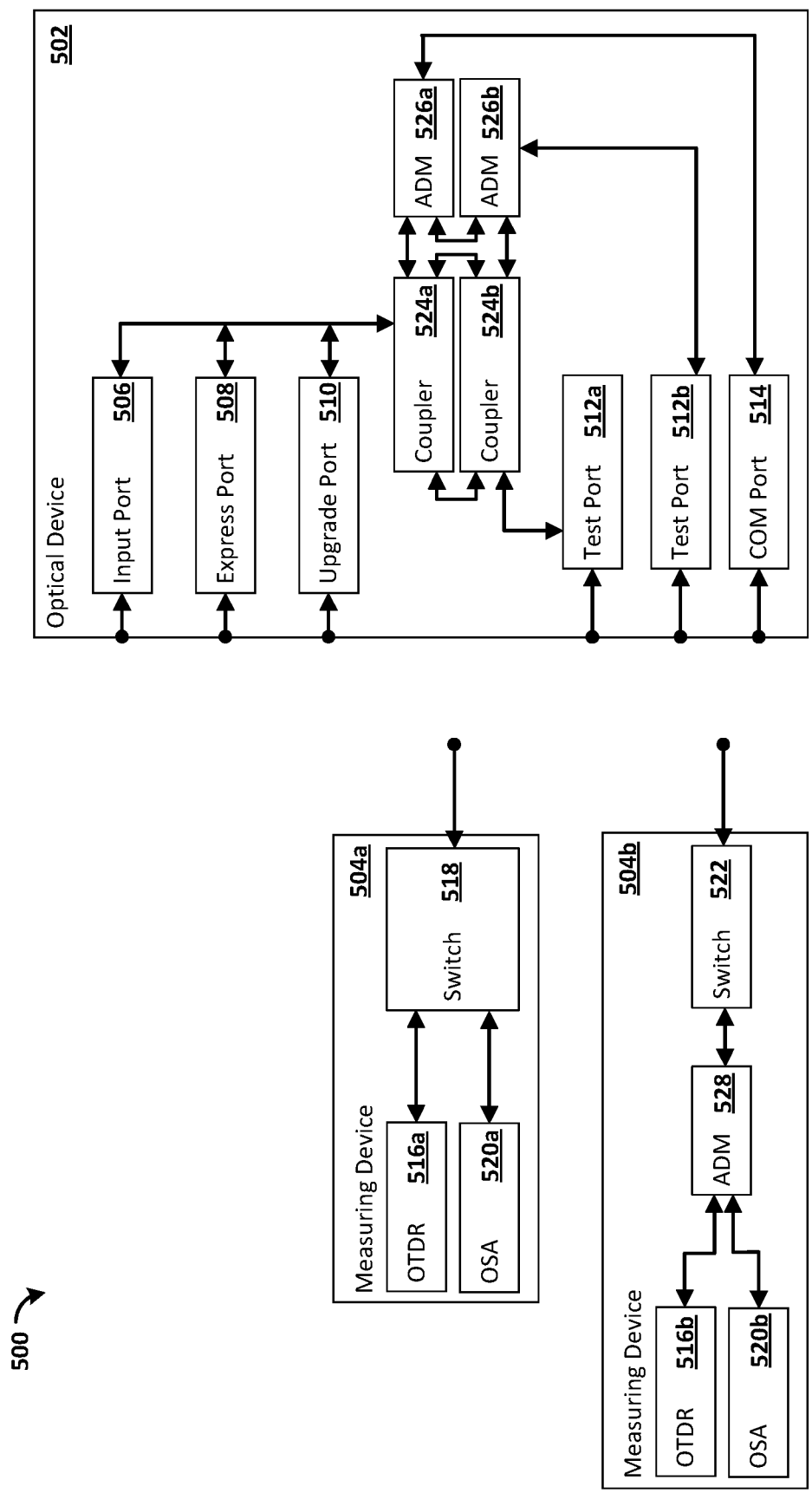
FIG. 5 shows a system for monitoring optical networks.

FIG. 5 shows a system 500 for monitoring a network. The system 500 may have an optical device 502 (e.g., the optical device 120 of FIG. 1), and measuring devices 504*a* and 504*b* (e.g., the measuring device 122 of FIG. 1). The system 500 may monitor an optical network (e.g., a fiber optic network). While a single optical device 502 and two measuring devices 504*a* and 504*b* are shown for ease of explanation, a person skilled in the art would appreciate that the system 500 may have any number of optical devices 502 and measuring devices 504. The measuring devices 504 may be in communication with a plurality of optical devices 302 (e.g., 2, 5, 50, 100, 500, etc.). The optical device 502 may be a passive optical device.

The optical device 502 may have an input port 506. The input port 506 may receive one or more data signals via one or more optical links. The data signals may be optical data signals. Each of the data signals may be associated with a respective wavelength of light. Each of the optical links may have an associated wavelength of light (e.g., data signal). The input port 506 may have a plurality of ports (not shown) in communication with the one or more optical links. That is, the input port 506 may have a separate port associated with each optical link. The input port 506 may aggregate wavelengths of light received from the one or more optical links. The input port 506 may receive the data signals (e.g., the wavelengths of light) via the one or more optical links. The input port 506 may combine the received data signals into a single combined data signal. The input port 506 may transmit the combined data signal (e.g., to the coupler 528). Thus, the input port 506 may have the capability to be a multiplex (MUX) if input port 506 receives a plurality of data signals. The input port 506 may utilize wavelengths of light ranging from 1200 nm to 1600 nm. Further, the express port 508 and the upgrade port 510 may add one or more data signals to the combined data signal.

The input port 506 may separate wavelengths of light from a combined data signal. The input port 506, the express port 508, and/or the upgrade port 510 may receive the combined data signal (e.g., from the coupler 524*a*). The input port 506 may separate the combined data signal into one or more separate data signals (e.g., wavelengths of light). The input port 506 may separate the combined data signal into one or more separate data signals. The input port 506 may be an output port that outputs the separated data signals on the optical links associated with the input port 506. The input port 506 may transmit the separated data signals to respective optical links. Thus, the input port 506 may have the capability to be a demultiplex (DMUX) if the input port 506 receives a single combined data signal.

The optical device 502 may have an express port 508 and an upgrade port 510. The express port 508 and the upgrade port 510 may be in communication with the input port 506. The input port 506 may provide received data signals to other components of the optical device 502 (e.g., a coupler 524*a*). The express port 508 and the upgrade port 510 may provide additional wavelengths of light (e.g., outside the wavelengths of light associated with the input port 506) that the optical device 502 may utilize. The express port 508 may utilize wavelengths associated with a Conventional (C) band. The C band may have wavelengths of light ranging from 1530-1565 nm. The upgrade port 510 may utilize wavelengths of light associated with bands other than the C band. The upgrade port 510 may utilize the Long Wavelengths (L) band that has wavelengths of light ranging from 1565-1625 nm, and the Ultra-Long Wavelengths (U) band that has wavelengths of light ranging from 1625-1675 nm. While the express port 508 and the upgrade port 510 are shown as separate ports for ease of explanation, a person skilled in the art would appreciate that the input port 506 may have the capability of the express port 508 and the upgrade port 510.

The optical device 502 may have test ports 512*a* and 512*b*. The test ports 512*a,b* may allow a measuring device (e.g., the measuring devices 504*a* and 504*b*) to measure (e.g., test) data signals sent via the optical device 502. Stated differently, the test ports 512*a,b* may output one or more data signals that are sent via the optical device 502 to allow the measuring device to determine one or more characteristics of the optical network. Accordingly, the measuring device may utilize the tests ports 512*a,b* to determine one or more characteristics of the optical network. The measuring device may determine a power level, power spectral density, and one or more wavelengths associated with the data signals. The measuring device may determine a power level associated with the data signals in both the forward and reverse direction at each specific wavelength or in each specific channel passband.

The optical device 502 may have a common (COM) port 514 that provides an interface to an optical link. The COM port 514 may receive the combined data signal provided by the input port 506, the express port 508, and/or the upgrade port 510. The COM port 514 may output the combined data signal on an optical link associated with the COM port 514. The COM port 514 may receive a data signal (e.g., a combined data signal having a plurality of wavelengths of light) from the optical link and provide the data signal to the input port 506 for the input port 506 to separate out wavelengths of light associated with the data signal.

The measuring device 504a may have an Optical Time Domain Reflectometer (OTDR) 516a, a switch 518, and an Optical Spectrum Analyzers (OSA) 520a. The OTDR 516a may measure a power associated with an optical network (e.g., the network 105 of FIG. 1). The OTDR 516 may measure a continuity of a communication link and/or communication path of the optical network (e.g., the network 105 of FIG. 1). The OTDR 516a may send a test signal via a test port associated with the optical device 502. The test signal may be associated with a specific wavelength of light. The OTDR 516a may utilize a wavelength outside (e.g., higher than) the wavelengths of light associated with the data signals received by the optical device 502. By utilizing a wavelength higher than the wavelength of light associated with the data signals, the OTDR 516a may detect problems (e.g., power reduction) with the network before the data signals are impacted. The OSA 520a may measure the data signals sent via the optical device 502. Each data signal may be associated with a respective wavelength of light. The OSA 520a may measure the data signals sent in a first direction (e.g., forwards) through the optical device 502, and may measure the data signal sent in a second direction (e.g., backwards) through the optical device 502. That is, the OSA 520a is capable of measuring data signals sent both forwards and backwards. Accordingly, the measuring device 504a is capable of measuring all characteristics of the network associated with the optical device 502.

The switch 518 may be in communication with the OTDR 516a and the OSA 520a. The switch 518 may be a 1 by X switch, where X is the number of input ports and the 1 relates to the number of outputs of the switch. The number of input ports may be determined based on a number of optical devices (e.g., one or more of the optical devices 502 or other optical devices) the switch 518 may communicate with. The switch 518 may be 2 by X switch, 3 by X switch, and so forth. The switch 518 may not have the same number of ports as the input ports of the optical device 502. The switch 518 may receive as input an output (e.g., a data signal) associated with a test port (e.g., the test ports 512a,b) of the optical device 502. The switch 518 may send the received signal to the OTDR 516a. The switch 518 may send an output to a test port (e.g., the test ports 512a,b). The switch 518 may receive a signal from the OTDR 516a and send the signal to a test port of the optical device 502. The switch 518 may receive a signal from and/or send the signal to the test port (e.g., the test ports 512a,b).

The measuring device 504b may have an Optical Time Domain Reflectometer (OTDR) 516b, an Optical Spectrum Analyzers (OSA) 520b, a switch 522, and an ADM 528. The OTDR 516b may measure a power associated with an optical network (e.g., the network 105 of FIG. 1). The OTDR 516b may send a test signal via a test port associated with the optical device 502. The test signal may be associated with a specific wavelength of light. The OTDR 516b may utilize a wavelength outside (e.g., higher than) the wavelengths of light associated with the data signals received by the optical device 502. By utilizing a wavelength higher than the wavelength of light associated with the data signals, the OTDR 516b may detect problems (e.g., power reduction) with the network before the data signals are impacted. The OSA 520b may measure the data signals sent via the optical device 502. Each data signal may be associated with a respective wavelength of light. The OSA 520b may measure the data signals sent in a first direction (e.g., forwards) through the optical device 502, and may measure the data signal sent in a second direction (e.g., backwards) through the optical device 502. That is, the OSA 520b is capable of measuring data signals sent both forwards and backwards.

The switch 522 may be in communication with the OTDR 516b and the OSA 520b. The switch 522 may be a 1 by X switch, where X is the number of input ports and the 1 relates to the number of outputs of the switch. The number of input ports may be determined based on a number of optical devices (e.g., one or more of the optical devices 502 or other optical devices) the switch 522 may communicate with. The switch 522 may be a 1 by 48 switch. The switch 522 may be 2 by X switch, 3 by X switch, and so forth. The switch 522 may not have the same number of ports as the input ports of the optical device 502. The switch 522 may receive as input an output (e.g., a data signal) associated with a test port (e.g., the test ports 512a,b) of the optical device 502. The switch 522 may send the received signal to the ADM 528. The switch 522 may send an output to a test port (e.g., the test ports 512a,b). The switch 522 may receive a signal from the ADM 528 and send the signal to a test port of the optical device 502.

The ADM 528 may be in communication with the OTDR 516b, the OSA 520b, and the switch 522. The ADM 528 may have an input, an output, and an add/drop output. The ADM 528 may receive a combined signal from the switch 522 having a plurality of different wavelengths of light, and may drop (e.g., remove) a wavelength of light from the combined signal. The dropped (e.g., removed) wavelength of light may be provided on the add/drop output. The add/drop output of the ADM 528 may be in communication with the OTDR 520b. The remaining combined signal may be provided on the output. The output may be in communication with the OSA 516b. The ADM 528 may receive (e.g., from the OTDR 520b) an input signal via the add/drop output. The input signal via the add/drop output may be at the same wavelength of light as the dropped signal. The ADM 528 may add the input signal received via the add/drop output to the remaining combined signal. The ADM 528 may send the combined signal to the switch 522. The ADM 528 may drop and/or add a wavelength of light outside of the wavelengths of light associated with data signals. The combined signal may have a plurality of wavelengths of light that are data signals ranging from 1200 nm to 1600 nm. The ADM may drop and/or add a wavelength of light that is greater than (e.g., higher than) the maximum wavelength of light for the data signals. The wavelength of light may be 1610 nm, 1611 nm, 1620 nm, and so forth. Accordingly, the measuring device 504b may be capable of measuring all characteristics of the network associated with the optical device 502. Further, while measuring devices 504a and 504b are shown in FIG. 5 for ease of explanation, each measuring device 504a,b may be used separately to measure all wavelengths of light and characteristics of the communications network. Thus, only one of the measuring devices 504a,b is needed to measure all characteristics of the communications network. Furthermore, as will be appreciated by one skilled in the art, the measuring device 504b provides the same capabilities as the measuring device 504a but without a switch with two outputs.

The optical device 502 may have coupler 524a and 524b. The coupler 524a may receive as input a combined signal (e.g., from the input port 506, the express port 508, the upgrade port 510, and/or the COM port 514) and output two or more different power levels of the combined signal on two or more outputs. The coupler 524a may be a 2×2 coupler. That is, the coupler 524a may have two inputs and two outputs.

The coupler 524a may receive an input from the input port 506. The coupler 524a may provide a first output to the coupler 524b and a second output to an ADM 526a. The coupler 524a may output 99% of the combined signal on the second output, and 1% of the combined signal on the first output. The coupler 524a may output 98% of the combined signal on the second output, and may output 2% of the combined signal on the first output.

The coupler 524a may receive an input from the ADM 526a. The coupler 524a may provide a first output to the coupler 524b and a second output to the input port 506. The coupler 524a may output 99% of the combined signal on the second output, and 1% of the combined signal on the first output. The coupler 524a may output 98% of the combined signal on the second output, and may output 2% of the combined signal on the first output. While outputs totaling 100% are used for ease of explanation, a person skilled in the art would appreciate that any combination of outputs provided by the coupler may be used, including combinations above or below 100%.

The coupler 524b may receive as input a signal (e.g., from the coupler 524a) and output two or more different power levels of the combined signal on two or more outputs. The coupler 524b may be a 2×2 coupler. That is, the coupler 524b may have two inputs and two outputs. The coupler 524b may be in communication with the test ports 512a and the ADM 526b. The coupler 524b may receive an input from the coupler 524a. The coupler 524b may provide a first output to the test port 512a and a second output to the ADM 526b. The coupler 524b may output 50% of the combined signal on the second output, and 50% of the combined signal on the first output. As will be appreciated by one skilled in the art, the percentages may not be exactly even due to imperfections in manufacturing and/or operating conditions. Further, while outputs totaling 100% are used for ease of explanation, a person skilled in the art would appreciate that any combination of outputs provided by the coupler may be used, including combinations above or below 100%.

The optical device 502 may have one or more Add-Drop Multiplexers (ADM) 526a,b. The ADM 526a may be in communication the COM port 514, the coupler 524a, and the ADM 526b. The ADM 526a may have an input, an output, and an add/drop output. The ADM 526a may receive a combined signal (e.g., from the coupler 524a, from the COM port 514) having a plurality of different wavelengths of light, and may drop (e.g., remove) a wavelength of light from the combined signal. The dropped (e.g., removed) wavelength of light may be provided on the add/drop output. The add/drop output of the ADM 526a may be in communication with the ADM 526b. The remaining combined signal may be provided on the output. The output may be in communication with the COM port 514 and/or the coupler 524a. The ADM 526a may receive (e.g., from the ADM 526b) an input signal via the add/drop output. The input signal via the add/drop output may be at the same wavelength of light as the dropped signal. The ADM 526a may add the input signal receive via the add/drop output to the remaining combined signal. The input signal receive via the add/drop output may be received by the ADM 526a from a measuring device (e.g., the measuring devices 504a,b) via a test port (e.g., the test ports 512a,b). The ADM 526a may drop and/or add a wavelength of light outside of the wavelengths of light associated with data signals. The combined signal may have a plurality of wavelengths of light that are data signals ranging from 1200 nm to 1600 nm. The ADM 526a may drop and/or add a wavelength of light that is greater than (e.g., higher than) the maximum wavelength of light for the data signals. The wavelength of light may be 1610 nm, 1611 nm, 1620 nm, and so forth.

The ADM 526b may be in communication with a test port (e.g., the test ports 512a,b), the coupler 524b, and the ADM 526a. The ADM 526b may have an input, an output, and an add/drop output. The ADM 526b may receive a combined signal (e.g., from the coupler 524b) having a plurality of different wavelengths of light, and may drop (e.g., remove) a wavelength of light from the combined signal. The dropped (e.g., removed) wavelength of light may be provided on the add/drop output. The add/drop output of the ADM 526b may be in communication with a test port (e.g., the test ports 512a,b). The remaining combined signal may be provided on the output. The output may be in communication with the coupler 524a and/or the test ports (e.g., the test ports 512a,b). The ADM 526b may be in communication with the add/drop output of the ADM 526a such that the ADM 526b receives the signal the ADM 526a adds/drops and sends the add/dropped signal to the test port (e.g., the test ports 512a,b). The ADM 526b may receive (e.g., from the test ports 512a,b) an input signal via the add/drop output. The input signal via the add/drop output may be at the same wavelength of light as the dropped signal. The ADM 526b may add the input signal receive via the add/drop output to the remaining combined signal. The ADM 526b may send the received input signal to the ADM 526a. The input signal received via the add/drop output may be received by the ADM 526b from a measuring device (e.g., the measuring devices 504a,b) via a test port (e.g., the test ports 512a,b). The ADM 526b may drop and/or add a wavelength of light outside of the wavelengths of light associated with data signals. The combined signal may have a plurality of wavelengths of light that are data signals ranging from 1200 nm to 1600 nm. The ADM may drop and/or add a wavelength of light that is greater than (e.g., higher than) the maximum wavelength of light for the data signals. The wavelength of light may be 1610 nm, 1611 nm, 1620 nm, and so forth.

The system 500 is capable of reducing the need for a jumper due to the addition of the ADM 526b to the optical device 502. The ADM 526b allows a single measuring device (e.g., one of the measuring devices 504a,b) to be utilized to measure all characteristics of the network, whereas FIG. 4 may require two separate measuring devices (e.g., the measuring devices 504a,b) connected via jumper. The system 500 has the same capabilities as system 400 but without needing a jumper.

Figure 6:
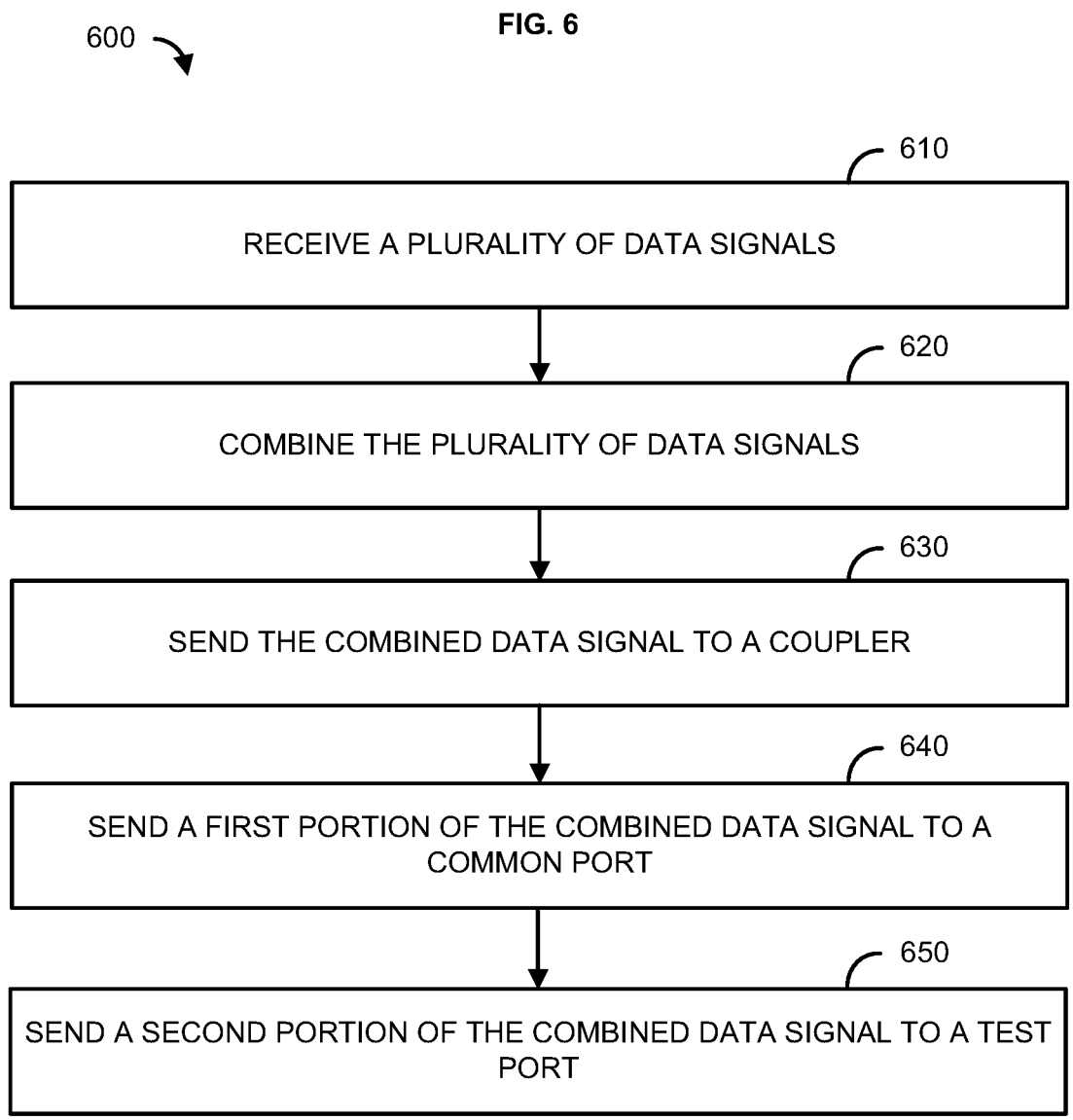
FIG. 6 shows a flowchart of a method for monitoring optical networks.

FIG. 6 is a flowchart of a method 600 for monitoring a network. At step 610, a plurality of data signals may be received. The plurality of data signals may be received by an apparatus. The plurality of data signals may be optical signals. The plurality of data signals may be received by an optical device (e.g., the optical device 120 of FIG. 1, the optical device 202 of FIG. 2, the optical device 302 of FIG. 3, the optical device 402 of FIG. 4, and/or the optical device

502 of FIG. 5). The plurality of data signals may be received by one or more input ports (e.g., the input port 206 of FIG. 2, the input port 306 of FIG. 3, the input port 406 of FIG. 4, and/or the input port 506 of FIG. 5) of the optical device. The plurality of data signals may be received by an express port (e.g., the express port 208 of FIG. 2, the express port 308 of FIG. 3, the express port 408 of FIG. 4, and/or the express port 508 of FIG. 5). The plurality of data signals may be received by an upgrade port (e.g., the upgrade port 210 of FIG. 2, the upgrade port 310 of FIG. 3, the upgrade port 410 of FIG. 4, and/or the upgrade port 510 of FIG. 5).

At step 620, the plurality of data signals may be combined. The plurality of data signals may be optical signals. The plurality of data signals may be combined by the input port, the express port, and/or the upgrade of the optical device.

At step 630, the combined data signal may be sent to a coupler (e.g., the coupler 228 of FIG. 2, the couplers 324 of FIG. 3, the couplers 424 of FIG. 4, and/or the couplers 524 of FIG. 5).

At step 640, a first portion of the combined data signal may be sent (e.g., by the coupler) to a first port associated with the apparatus. The first port may be a common port (e.g., the common port 214 of FIG. 2, the common port 314 of FIG. 3, the common port 414 of FIG. 4, and/or the common port 514 of FIG. 5). The coupler may divide the data signals. The first portion may be a portion of a power of the combined data signal. The common port may be an output for the optical device. The first portion of the combined data signal may be between 90 and 99 percent of an optical power of the combined data signal.

At step 650, the second portion of the combined data signal may be sent (e.g., by the coupler) to a second port associated with the apparatus. The second port associated with the apparatus may be a test port (e.g., the test ports 212 of FIG. 2, the test port 312 of FIG. 3, the test port 412 of FIG. 4, and/or the test port 512 of FIG. 5). The coupler may divide the data signals. The second portion may be a portion of a power of the combined data signal. The second portion of the combined data signal may be between 1 and 10 percent of the optical power of the combined data signal.

The method 600 may include receiving a second portion of the combined data signal by a second coupler. The second portion of the combined data signal may be split into a first half of the second portion and a second half of the second portion. The first half of the second portion may be sent to the second port associated with the apparatus. The second half of the second portion may be sent to a third port associated with the apparatus.

The method 600 may include receiving, by an add-drop multiplexer from the first coupler, the first portion of the combined data signal. The add-drop multiplexer may filter a data signal associated with a wavelength of light from the first portion of the combined data signal to produce a filter portion of the combined data signal. The add-drop multiplexer may send the filter portion of the combined data signal to the first port associated with the apparatus. The add-drop multiplexer may send the data signal associated with the wavelength of light to the second port associated with the apparatus. The combined data signal may have a maximum wavelength of 1600 nm, and the wavelength of light may be a wavelength greater than 1600 nm and less than 1700 nm.

Figure 7:
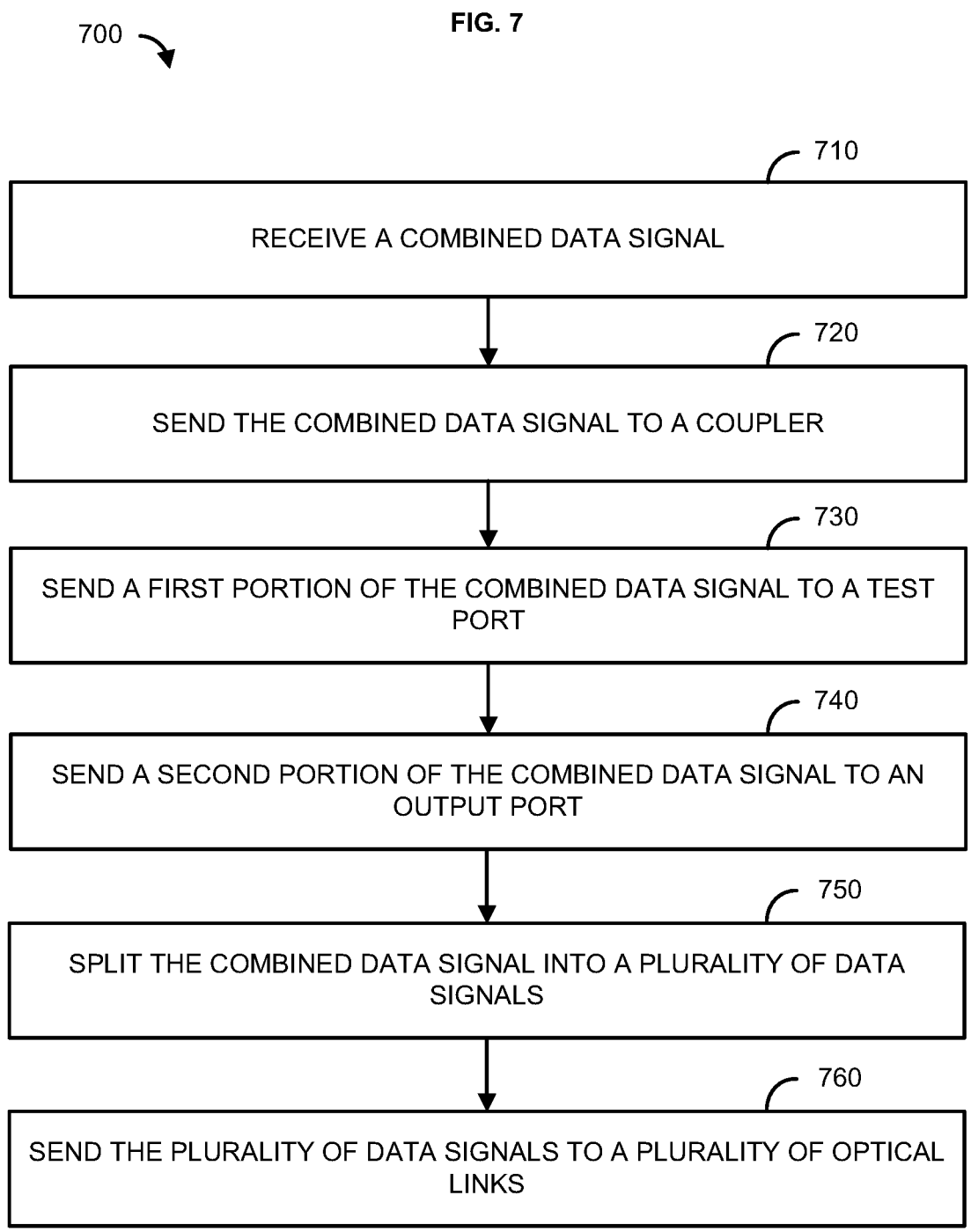
FIG. 7 shows a flowchart of a method for monitoring optical networks.

FIG. 7 is a flowchart of a method 700 for monitoring a network. At step 710, a combined data signal may be received. The combined data signal may be an optical signal. The combined data signal may be received by an optical device (e.g., the optical device 120 of FIG. 1, the optical device 202 of FIG. 2, the optical device 302 of FIG. 3, the optical device 402 of FIG. 4, and/or the optical device 502 of FIG. 5). The combined data signal may be received by a common port (e.g., the common port 214 of FIG. 2, the common port 314 of FIG. 3, the common port 414 of FIG. 4, and/or the common port 514 of FIG. 5).

At step 720, the combined data signal may be sent to a coupler (e.g., the coupler 228 of FIG. 2, the couplers 324 of FIG. 3, the couplers 424 of FIG. 4, and/or the couplers 524 of FIG. 5).

At step 730, a first portion of the combined data signal may be sent (e.g., by the coupler) to a first port associated with the apparatus. The first port associated with the apparatus may be a test port (e.g., the test ports 212 of FIG. 2, the test port 312 of FIG. 3, the test port 412 of FIG. 4, and/or the test port 512 of FIG. 5). The coupler may divide the data signals. The first portion may be a portion of a power of the combined data signal. The first portion of the combined data signal may be between 90 and 99 percent of an optical power of the combined data signal.

At step 740, a second portion of the combined data signal may be sent (e.g., by the coupler) to an output port. The output port may be an input port (e.g., the input port 206 of FIG. 2, the input port 306 of FIG. 3, the input port 406 of FIG. 4, and/or the input port 506 of FIG. 5) of the optical device. The output port may be an express port (e.g., the express port 208 of FIG. 2, the express port 308 of FIG. 3, the express port 408 of FIG. 4, and/or the express port 508 of FIG. 5). The output port may be an upgrade port (e.g., the upgrade port 210 of FIG. 2, the upgrade port 310 of FIG. 3, the upgrade port 410 of FIG. 4, and/or the upgrade port 510 of FIG. 5). The second portion of the combined data signal may be between 1 and 10 percent of the optical power of the combined data signal.

At step 750, the combined data signal may be split into a plurality of data signals. The second portion of the combined data signal may be split into a plurality of data signals. The plurality of data signals may be optical signals. The plurality of data signals may be split by the input port, the express port, and/or the upgrade of the optical device.

At step 760, the plurality of data signals may be sent to a plurality of optical links. The input port, the express port, and/or the upgrade of the optical device may output the plurality of data signals to the plurality of optical links.

The method 700 may include receiving a second portion of the combined data signal by a second coupler. The second portion of the combined data signal may be split into a first half of the second portion and a second half of the second portion. The first half of the second portion may be sent to the second port associated with the apparatus. The second half of the second portion may be sent to a third port associated with the apparatus.

The method 700 may include receiving, by an add-drop multiplexer from the first coupler, the combined data signal. The add-drop multiplexer may filter a data signal associated with a wavelength of light from the combined data signal to produce a filtered portion of the combined data signal. The add-drop multiplexer may send the filtered portion of the combined data signal to the first coupler of the apparatus. The add-drop multiplexer may send the data signal associated with the wavelength of light to the second port associated with the apparatus. The combined data signal may have a maximum wavelength of 1600 nm, and the wavelength of light may be a wavelength greater than 1600 nm and less than 1700 nm.

Figure 8:
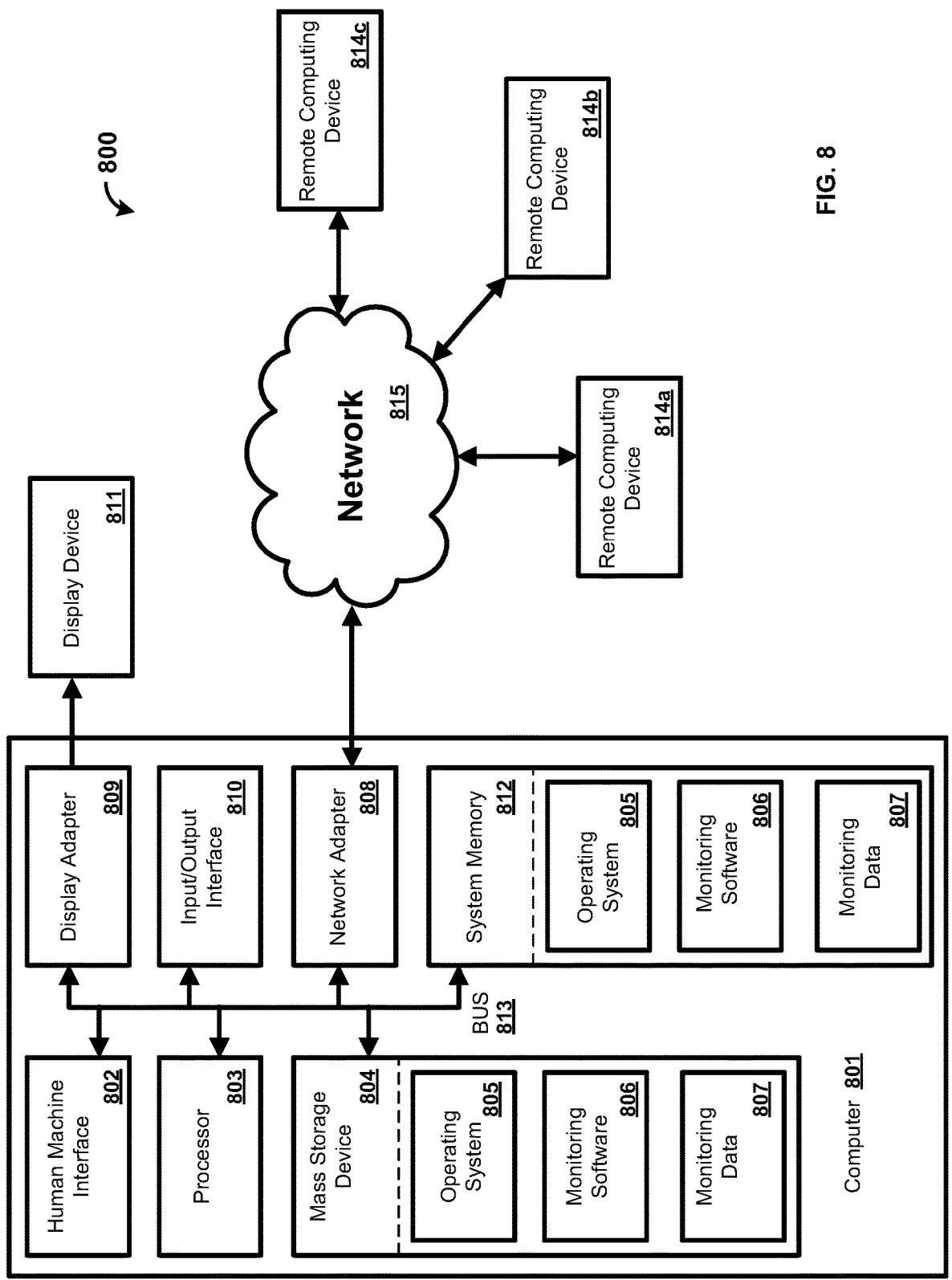
FIG. 8 shows a block diagram of a computing device for monitoring optical networks.

FIG. 8 shows a system 800 for a communications network. The user device 102, the computing device 104, the network device 118, the optical device 120, and/or the measuring device 122 of FIG. 1 may be a computer 801 as shown in FIG. 8. The measuring devices 204a,b,c, and/or the optical device 202 of FIG. 2 may be a computer 801 as shown in FIG. 8. The measuring device 304a, the measuring device 304b, and/or the optical device 302 of FIG. 3 may be a computer 801 as shown in FIG. 8. The measuring device 404a, the measuring device 404b, and/or the optical device 402 of FIG. 4 may be a computer 801 as shown in FIG. 8. The measuring device 504a, the measuring device 504b, and/or the optical device 502 of FIG. 5 may be a computer 801 as shown in FIG. 8.

The computer 801 may have one or more processors 803, a system memory 812, and a bus 813 that couples various system components including the one or more processors 803 to the system memory 812. In the case of multiple processors 803, the computer 801 may utilize parallel computing.

The bus 813 may be one or more of several possible types of bus structures, including a memory bus or memory controller, a peripheral bus, an accelerated graphics port, or local bus using any of a variety of bus architectures.

The computer 801 may operate on and/or have a variety of computer readable media (e.g., non-transitory). The readable media may be any available media that may be accessible by the computer 801 and may include both volatile and non-volatile media, removable and non-removable media. The system memory 812 has computer readable media in the form of volatile memory, such as random access memory (RAM), and/or non-volatile memory, such as read only memory (ROM). The system memory 812 may store data such as the monitoring data 807 and/or program modules such as the operating system 805 and the monitoring software 806 that are accessible to and/or are operated on by the one or more processors 803.

The computer 801 may also have other removable/non-removable, volatile/non-volatile computer storage media. FIG. 8 shows the mass storage device 804 which may provide non-volatile storage of computer code, computer readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like.

Any number of program modules may be stored on the mass storage device 804, such as the operating system 805 and the monitoring software 806. Each of the operating system 805 and the monitoring software 806 (or some combination thereof) may have elements of the program modules and the monitoring software 806. The monitoring data 807 may also be stored on the mass storage device 804. The monitoring data 807 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 815.

A user may enter commands and information into the computer 801 via an input device (not shown). Input devices may be, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 803 via a human machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

The display device 811 may also be connected to the bus 813 via an interface, such as the display adapter 809. It is contemplated that the computer 801 may have more than one display adapter 809 and the computer 801 may have more than one display device 811. The display device 811 may be a monitor, an LCD (Liquid Crystal Display), light emitting diode (LED) display, television, smart lens, smart glass, and/or a projector. In addition to the display device 811, other output peripheral devices may be components such as speakers (not shown) and a printer (not shown) which may be connected to the computer 801 via the Input/Output Interface 810. Any step and/or result of the methods may be output (or caused to be output) in any form to an output device. Such output may be any form of visual representation, including, but not limited to, textual, graphical, animation, audio, tactile, and the like. The display device 811 and computer 801 may be part of one device, or separate devices.

The computer 801 may operate in a networked environment using logical connections to one or more remote computing devices 814a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 801 and a remote computing device 814a,b,c may be made via a network 815, such as a local area network (LAN) and/or a general wide area network (WAN). Such network connections may be through the network adapter 808. The network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components reside at various times in different storage components of the computing device 801, and are executed by the one or more processors 803 of the computer. An implementation of the monitoring software 806 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a first coupler of an apparatus, a combined data signal;
sending, by the first coupler to a first port of the apparatus, a first portion of the combined data signal;
sending, by the first coupler to a second port of the apparatus, a second portion of the combined data signal associated with a first signal characteristic;
receiving, by the second port of the apparatus, based on the first portion of the combined data signal, a signal associated with the second portion of the combined data signal, wherein the signal is associated with a second signal characteristic; and
determining, based on a difference between the first signal characteristic and the second signal characteristic, a network condition impacting the combined data signal.

2. The method of claim 1, wherein the first port comprises a common port of the apparatus, and wherein the second port comprises a test port of the apparatus.

3. The method of claim 1, further comprising splitting the combined data signal into the first portion of the combined data signal and the second portion of the combined data signal.

4. The method of claim 3, wherein the first portion of the combined data signal comprises between 90 and 99 percent of an optical power of the combined data signal, and wherein the second portion of the combined data signal comprises between 1 and 10 percent of the optical power of the combined data signal.

5. The method of claim 1, wherein sending, by the first coupler to the second port of the apparatus, the second portion of the combined data signal further comprises:
receiving, by a second coupler, the second portion of the combined data signal;
splitting the second portion of the combined data signal into a first half of the second portion and a second half of the second portion;
sending, to the second port of the apparatus, the first half of the second portion; and
sending, to a third port of the apparatus, the second half of the second portion.

6. The method of claim 1, further comprising:
receiving, by an add-drop multiplexer from the first coupler, the first portion of the combined data signal;
filtering, from the first portion of the combined data signal, a data signal associated with a wavelength of light to produce a filtered portion of the combined data signal;
sending, to the first port of the apparatus, the filtered portion of the combined data signal; and
sending, to the second port of the apparatus, the data signal associated with the wavelength of light.

7. The method of claim 6, wherein the combined data signal comprises a maximum wavelength of 1600 nm, and wherein the wavelength of light comprises a wavelength greater than 1600 nm and less than 1700 nm.

8. The method of claim 1, wherein the network condition impacting the combined data signal comprises at least one of a contraction of a fiber optic cable, an expansion of the fiber optic cable, a break in the fiber optic cable, or a failure of the fiber optic cable.

9. The method of claim 1, wherein the first signal characteristic and the second signal characteristic comprise one or more wavelengths and one or more optical powers.

10. A method comprising:
receiving, by an apparatus, a combined data signal;
sending, by a first coupler to a test port of the apparatus, a first portion of the combined data signal;
sending, by the first coupler to an output port, at a first power a second portion of the combined data signal;
receiving, by the test port, based on the second portion of the combined data signal, at a second power, a test signal associated with the combined data signal; and
determining, based on a difference between the first power and the second power, a network condition impacting the combined data signal.

11. The method of claim 10, wherein the output port comprises at least one of a common port of the apparatus or an input port of the apparatus.

12. The method of claim 10, further comprising splitting the combined data signal into the first portion of the combined data signal and the second portion of the combined data signal.

13. The method of claim 12, wherein the second portion of the combined data signal comprises between 1 and 10 percent of an optical power of the combined data signal, and wherein the first portion of the combined data signal comprises between 90 and 99 percent of the optical power of the combined data signal.

14. The method of claim 10, wherein sending, by the first coupler to the output port, the second portion of the combined data signal further comprises:
receiving, by a second coupler, the second portion of the combined data signal;
sending, to the output port of the apparatus, a filtered portion of the second portion; and
sending, to a second port of the apparatus, a test portion of the second portion.

15. The method of claim 10, wherein receiving the combined data signal further comprises:
receiving, by an add-drop multiplexer from a first port, the combined data signal;
filtering, from the combined data signal, a data signal associated with a wavelength of light to produce the filtered portion of the combined data signal;
sending, to the first coupler, the filtered portion of the combined data signal; and
sending, to the first port, the data signal associated with the wavelength of light.

16. The method of claim 15, wherein the combined data signal comprises a maximum wavelength of 1600 nm, and wherein the wavelength of light comprises a wavelength greater than 1600 nm and less than 1700 nm.

17. The method of claim 10, wherein the network condition impacting the combined data signal comprises at least one of a contraction of a fiber optic cable, an expansion of the fiber optic cable, a break in the fiber optic cable, or a failure of the fiber optic cable.

18. An apparatus comprising:
a first port;
a second port;
an input port, configured to:
receive, via a plurality of optical links, a plurality of data signals, and
combine the plurality of data signals into a combined data signal; and
a first coupler, configured to:
receive the combined data signal,
send, to the first port, a first portion of the combined data signal, and
send, to the second port, a second portion of the combined data signal associated with a first signal characteristic; and
the second port configured to receive, based on the first portion of the combined data signal, a signal associated with the second portion of the combined data signal, wherein the signal is associated with a second signal characteristic; and
wherein the apparatus is further configured to determine, based on the a difference between the first signal characteristic and the second signal characteristic, a network condition impacting the combined data signal.

19. The apparatus of claim 18, wherein the first port comprises a common port of the apparatus, and wherein the second port comprises a test port of the apparatus.

20. The apparatus of claim 18, wherein the first coupler is further configured to split the combined data signal into the first portion of the combined data signal and the second portion of the combined data signal.

21. The apparatus of claim 20, wherein the first portion of the combined data signal comprises between 90 and 99 percent of an optical power of the combined data signal, and wherein the second portion of the combined data signal comprises between 1 and 10 percent of the optical power of the combined data signal.

22. The apparatus of claim 18, wherein the apparatus further comprises a second coupler configured to:
receive, from the first coupler, the second portion of the combined data signal;
split the second portion of the combined data signal into a first half of the second portion and a second half of the second portion;
send, to the second port, the first half of the second portion; and
send, to a third port, the second half of the second portion.

23. The apparatus of claim 18, wherein the apparatus further comprises an add-drop multiplexer configured to:
receive, from the first coupler, the first portion of the combined data signal;
filter, from the first portion of the combined data signal, a data signal associated with a wavelength of light to produce a filtered portion of the combined data signal;
send, to the first port, the filtered portion of the combined data signal; and
send, to the second port, the data signal associated with the wavelength of light.

24. The apparatus of claim 18, wherein the network condition impacting the combined data signal comprises at least one of a contraction of a fiber optic cable, an expansion of the fiber optic cable, a break in the fiber optic cable, or a failure of the fiber optic cable.

* * * * *